(12) United States Patent
Matsubara et al.

(10) Patent No.: US 10,579,763 B2
(45) Date of Patent: Mar. 3, 2020

(54) OPTIMIZATION APPARATUS AND METHOD OF CONTROLLING OPTIMIZATION APPARATUS

(71) Applicant: FUJITSU LIMITED, Kawasaki-shi, Kanagawa (JP)

(72) Inventors: Satoshi Matsubara, Machida (JP); Motomu Takatsu, Shinjuku (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/021,259

(22) Filed: Jun. 28, 2018

(65) Prior Publication Data

US 2019/0012410 A1 Jan. 10, 2019

(30) Foreign Application Priority Data

Jul. 6, 2017 (JP) .................. 2017-132496

(51) Int. Cl.
| | | |
|---|---|---|
| *G06F 17/50* | (2006.01) | |
| *G06F 17/17* | (2006.01) | |
| *G06F 17/11* | (2006.01) | |
| *G06N 7/08* | (2006.01) | |
| *G06F 7/58* | (2006.01) | |
| G06N 7/00 | (2006.01) | |
| G06N 5/00 | (2006.01) | |

(52) U.S. Cl.
CPC ............ *G06F 17/505* (2013.01); *G06F 7/588* (2013.01); *G06F 17/11* (2013.01); *G06F 17/17* (2013.01); *G06F 17/5036* (2013.01); *G06N 7/08* (2013.01); *G06F 2217/08* (2013.01); *G06F 2217/78* (2013.01); *G06F 2217/80* (2013.01); *G06N 5/003* (2013.01); *G06N 7/005* (2013.01)

(58) Field of Classification Search
USPC ......................................................... 716/133
See application file for complete search history.

(56) References Cited

U.S. PATENT DOCUMENTS

2013/0290763 A1* 10/2013 Katsumata .......... G06F 11/1658
713/330

FOREIGN PATENT DOCUMENTS

| JP | 2001-250102 | 9/2001 |
| JP | 2005-258609 | 9/2005 |

OTHER PUBLICATIONS

Japanese Platform for Patent Information English abstract for Japanese Patent Publication No. 2005-258609, published Sep. 22, 2005.

(Continued)

*Primary Examiner* — Bryce M Aisaka
(74) *Attorney, Agent, or Firm* — Staas & Halsey LLP

(57) ABSTRACT

When stochastically deciding, based on a change in energy and a random number relating to thermal excitation, whether to accept any of a plurality of state transitions according to the relative relationship between the change in energy and thermal excitation energy, a transition control unit adds an offset to the change in energy, performs control so that the offset at a local minimum where energy is locally minimized is larger than an offset when the energy is not minimized, holds transition information (a transition number) indicating a previous state transition, and prohibits, based on a decoding result for the held transition information, a first state transition out of the present state transition candidates.

8 Claims, 17 Drawing Sheets

(56) References Cited

OTHER PUBLICATIONS

Japanese Platform for Patent Information English abstract for Japanese Patent Publication No. 2001-250102, published Sep. 14, 2001.
Christian R. Schneider et al., "Analog CMOS Deterministic Boltzmann Circuits", IEEE Journal of Solid-State Circuits, vol. 28, No. 8, Aug. 1993, pp. 907-914.

* cited by examiner

| STATE | Q1 | Q2 | Q3 | D1 | D2 | D3 |
|---|---|---|---|---|---|---|
| 0 | 0 | 0 | 0 | 0 | 0 | f |
| 1 | 0 | 0 | 1 | 0 | 1 | 0 |
| 2 | 0 | 1 | 0 | 0 | 1 | 1 |
| 3 | 0 | 1 | 1 | 1 | 0 | 0 |
| 4 | 1 | 0 | 0 | 0 | 0 | 0 |

FIG. 8

OPTIMIZATION APPARATUS AND METHOD OF CONTROLLING OPTIMIZATION APPARATUS

CROSS-REFERENCE TO RELATED APPLICATION

This application is based upon and claims the benefit of priority of the prior Japanese Patent Application No. 2017-132496, filed on Jul. 6, 2017, the entire contents of which are incorporated herein by reference.

FIELD

The embodiments discussed herein are related to an optimization apparatus and a method of controlling an optimization apparatus.

BACKGROUND

Data processing is now used in every field in society. Processing by computers and other processing equipment computes and manipulates all kinds of data to produce meaningful results used to make predictions, take decisions, and control systems. One important field of data processing is optimization. When certain processing is to be performed, it is imperative to minimize the resources and cost, and to find a solution that optimizes the result of the processing. This issue is of clear importance.

Linear programming is a representative example of an optimization problem. Linear programming finds the values of variables that maximize or minimize an evaluation function represented by a linear sum of a plurality of continuous variables under constraints also represented by linear sums, and is used in a variety of fields, such as production scheduling of products. Superior algorithms, such as the simplex method and interior point method, are known for linear programming and make it possible to efficiently solve problems, even those with hundreds of thousands of variables.

However, many known optimization problems have variables that are not continuous values and instead take discrete values. Representative examples include the traveling salesman problem of finding the shortest route that passes a plurality of cities in turn and returns to the start, and the knapsack problem of finding a combination that maximizes a sum of values when packing different items into a knapsack. These problems are referred to as "discrete optimization problems" or "combination optimization problems", and are known to present great difficulty when finding an optimal solution.

The principal reason why it is difficult to solve a discrete optimization problem is that due to the respective variables taking only discrete values, it is not possible to use methods that reach the optimal solution by continuously changing variables in a direction in which an evaluation function improves. In addition to the combination of values of variables that produces an optimal value (this combination is referred to as an "optimal solution", a "global solution", or a "global minimum"), there are a large number of combinations that provide a local extreme value for an evaluation function (these combinations are referred to as a "minimal" (or "maximal"), a "local solution", or a "local minimum"). This means that in order to reliably obtain an optimal solution, the use of brute-force type methods is unavoidable, which results in the calculation time becoming very long. Among discrete optimization problems, there are many problems where the calculation time taken to obtain the optimal solution is expected to increase exponentially with respect to the size of the problem (that is, the number of variables in the problem). These problems are referred to as "NP (Non-deterministic Polynomial)-hard" problems in computational complexity theory. The traveling salesman problem and the knapsack problem mentioned above are both examples of NP-hard problems.

As described above, it is very difficult to reliably obtain an optimal solution to a discrete optimization problem. For this reason, algorithms that make use of properties that are peculiar to individual problems have been proposed for solving discrete optimization problems that are of practical importance. As described above, since the calculation time taken to obtain a precise solution is expected to increase exponentially for many discrete optimization problems, many practical approaches are approximation algorithms, and although an optimal solution is not achieved, it is still possible to obtain a solution where the value of the evaluation function is close to the optimal value.

In contrast to approximation algorithms that are specific to certain problems, there are also approximation algorithms that do not use specific properties of problems and are instead compatible with a wide range of problems. These algorithms are referred to as "metaheuristics", with simulated annealing (or "SA"), genetic algorithms, and neural networks as representative examples. Although these metaheuristics potentially have lower efficiency than solutions that make effective use of the properties of a problem, they are expected to find a solution faster than algorithms that obtain a precise solution.

Out of these methods, the present embodiments relate to simulated annealing.

Simulated annealing is one type of Monte Carlo method and uses random numbers to stochastically find a solution. As one example, the following describes a problem where the value, here referred to as "energy", of an evaluation function to be optimized is to be minimized. As an alternative, the value is maximized by changing the signs used in the evaluation function.

Starting from an initial state where a discrete value is assigned to each variable, a state that is close to the present state (here meaning a combination of values of variables) is selected from the present state. As one example, a state where only one of the variables has changed is selected, and this state transition is considered. The change in energy for this state transition is calculated, and depending on the calculated value, it is stochastically decided whether to adopt the state transition and change states or whether to not adopt the transition and keep the original state. If the probability of adoption is set larger for cases where the energy falls than for cases where the energy rises, on average the state will change in a direction in which the energy falls, so that state transitions to a more appropriate state are expected to occur as time passes. There is also the possibility of ultimately obtaining the optimal solution or an approximate solution that provides an energy that is close to the optimal value. By comparison, with a deterministic configuration where transitions are adopted when energy falls and are not adopted when the energy rises, although the energy will change so as to monotonously decrease over time in the broadest sense, such changes will stop occurring when a local minimum is reached. Since discrete optimization problems have a very large number of local minimums as described above, the state will almost certainly get caught at a local minimum which is not very close to the optimal value. For this reason, it is important to stochastically decide whether transitions are adopted.

For the simulated annealing method, it has been established that when the adoption (permission) probability of a state transition is decided as indicated below, the state will reach the optimal solution when the limit on time (i.e., the number of iterations) is set at infinity.

(1) The permission probability p of a state transition is determined relative to the change in energy (or "energy decrease") (−ΔE) caused by the state transition according to either of the functions f( ) below.

$$p(\Delta E, T) = f(-\Delta E/T) \quad (1\text{-}1)$$

$$f_{metro}(x) = \min(1, e^x) \text{ (Metropolis Method)} \quad (1\text{-}2)$$

$$f_{Gibbs}(x) = \frac{1}{1 + e^{-x}} \text{ (Gibbs Method)} \quad (1\text{-}3)$$

Here, T is a parameter called a "temperature" that changes as indicated below.

(2) The temperature T logarithmically decreases with respect to the number of iterations t as expressed by the following equation.

$$T = \frac{T_0 \log(c)}{\log(t + c)} \quad (2)$$

Here, $T_0$ is the initial temperature and is preferably set at a sufficiently large value for the problem to be solved.

When the permission probability expressed by expressions in the above (1) is used, once a sufficient number of iterations have been performed and a steady state is reached, the occupation probability of each state will follow a Boltzmann distribution for a thermal equilibrium in thermodynamics. Since the occupation probability of a low energy state will increase as the temperature gradually decreases from the initial high temperature, a low energy state is usually obtained when the temperature has fallen sufficiently. Since this is similar to the changes in state that occur when a material is annealed, this method is called "simulated annealing". At this time, state transitions where the energy increases occur stochastically, which corresponds to the phenomenon of thermal excitation in physics.

As described above, although simulated annealing obtains an optimal solution when the number of iterations is infinite, in reality a finite number of iterations are used to obtain a solution, which means that there is no guarantee that the optimal solution will be found. Also, since the fall in temperature in the expression given above is very slow, the temperature will not fall sufficiently in a finite time. Accordingly, during actual simulated annealing, it is common for the temperature to not change logarithmically and instead be decreased rapidly.

FIG. 14 depicts the conceptual configuration of an optimization apparatus that uses simulated annealing. Although a case where a plurality of state transition candidates are generated is described later, the following description focuses on a basic form of simulated annealing where transition candidates are generated one at a time.

The optimization apparatus 10 has a state holding unit 11 that first holds a current state S (i.e., the values of a plurality of state variables). The optimization apparatus 10 also includes an energy calculating unit 12 that calculates a change in energy $\{-\Delta E_i\}$ of each state transition when a state transition from the present state S has occurred due to a change in any of a plurality of state variables. The optimization apparatus 10 also includes a temperature control unit 13 that controls the temperature T and a transition control unit 14 for controlling changes in state.

Based on the temperature T, the change in energy $\{-\Delta E_i\}$, and a random number, the transition control unit 14 stochastically decides whether to accept any of a plurality of state transitions according to a relative relationship between the change in energy $\{-\Delta E_i\}$ and the thermal excitation energy.

When subdivided, the transition control unit 14 includes a candidate generating unit 14a that generates a state transition candidate and a transition assessor 14b that stochastically judges whether to permit each state transition candidate based on the change in energy $\{-\Delta E_i\}$ and the temperature T. In addition, the transition control unit 14 includes a transition deciding unit 14c that decides a candidate to be adopted out of the permitted candidates and a random number generating unit 14d that generates a stochastic variable.

The operation in one iteration is as follows. First, the candidate generating unit 14a generates one or a plurality of candidates (with the candidate numbers {Ni}) for state transitions from the present state S held in the state holding unit 11 to a next state. The energy calculating unit 12 calculates the change in energy $\{-\Delta E_i\}$ for each state transition given as a candidate using the present state S and the state transition candidate. The transition assessor 14b uses the temperature T generated by the temperature control unit 13 and the stochastic variable (random number) generated by the random number generating unit 14d to permit state transitions with the permission probability in expressions described in the above (1) in accordance with the change in energy $\{-\Delta E_i\}$ of each state transition. The transition assessor 14b outputs a transition permission value {fi} indicating whether each state transition is to be accepted (this is referred to in the following description as "permission" of a state transition). When a plurality of state transitions are permitted, the transition deciding unit 14c randomly selects one of the state transitions using a random number. The transition deciding unit 14c then outputs the transition number N of the selected state transition and the transition permission value f. When there is a permitted state transition, the values of the state variables stored in the state holding unit 11 are updated in accordance with the adopted state transition.

Starting from an initial state, the iteration described above is repeated while lowering the temperature at the temperature control unit 13 until an end judgment condition is satisfied, such as reaching a certain number of iterations or the energy falling below a certain value, at which point the operation ends. The solution outputted from the optimization apparatus 10 is the state when the operation ends. In practice, however, the temperature will not reach zero in a finite number of iterations, so that the occupation probabilities of states at the end will have a distribution represented by a Boltzmann distribution or the like and will not necessarily be the optimal value or a good solution. Accordingly, a practical method of holding a state with the lowest energy obtained during the iterations and ultimately outputting this state as the solution is used.

FIG. 15 is a circuit-level block diagram of an example configuration of a computing portion used for a transition control unit, and in particular a transition assessor, in regular simulated annealing where candidates are generated one at a time.

The transition control unit 14 includes a random number generating circuit 14b1, a selector 14b2, a noise table 14b3, a multiplier 14b4, and a comparator 14b5.

The selector 14b2 selects and outputs a change in energy, out of the change in energy $\{-\Delta E_i\}$ calculated for every state transition candidate, which corresponds to the transition number N that is a random number generated by the random number generating circuit 14b1.

The functions of the noise table 14b3 are described later. As examples of the noise table 14b3, it is possible to use a memory such as RAM (Random Access Memory) and flash memory.

The multiplier 14b4 outputs a product (corresponding to the thermal excitation energy described earlier) produced by multiplying the value outputted by the noise table 14b3 and the temperature T.

The comparator 14b5 outputs, as a transition permission value f, a comparison result produced by comparing the multiplication result outputted by the multiplier 14b4 and $-\Delta E$ that is the change in energy selected by the selector 14b2.

Although the transition control unit 14 depicted in FIG. 15 is basically a direct implementation of the functions described earlier, the mechanism for permitting a state transition according to a permission probability expressed by expressions in the above (1) has not been touched upon and so will be described here.

A circuit that outputs one with a permission probability p and outputs zero with a probability of (1-p) may be realized by inputting the permission probability p into an input A of a comparator that has two inputs A and B and is configured to output one when A>B and output zero when A<B, and inputting a uniform random number that takes a value in the interval [0,1) into the input B. Accordingly, by inputting a value of permission probability p calculated from the change in energy and the temperature T using expressions in the above (1) into the input A of this comparator, the function described above is realized.

In other words, when f is a function used in expressions in the above (1) and u is a uniform random number that takes a value in the interval [0,1), a circuit that outputs one when $f(-\Delta E/T)$ is larger than u realizes the function described above.

While the above configuration will work, it is also possible to realize the same function via the following modification. When two numbers are operated using the same monotonically increasing function, the relative magnitudes of the two values will not change. Accordingly, the output of a comparator will not change when the two inputs are operated using the same monotonically increasing function. When an inverse function $f^{-1}$ of a function f is used as the monotonically increasing function, a circuit that outputs one when $-\Delta E/T$ is larger than $f^{-1}(u)$ may be used. Also, since the temperature T is positive, a circuit that outputs one when $-\Delta E$ is larger than $Tf^{-1}(u)$ may be used. The noise table 14b3 in FIG. 15 is a conversion table for realizing the inverse function $f^{-1}(u)$ and is a table that outputs values of the following function for an input of discrete values in the interval [0, 1).

$$f_{metro}^{-1}(u) = \log(u) \quad (3\text{-}1)$$

$$f_{Gibbs}^{-1}(u) = \log\left(\frac{u}{1-u}\right) \quad (3\text{-}2)$$

Although a latch that holds a judgment result, a state machine that generates timing for the latch, and the like are also present in the transition control unit 14, such elements have been omitted from FIG. 15 to simplify the drawing.

FIG. 16 depicts an operation flow of a transition control unit according to a conventional example. The operation flow includes a step that selects one state transition as a candidate (S1), a step that decides whether the state transition is permitted according to a comparison between the change in energy for the state transition and a product of a temperature and a random number (S2), and a step that adopts the state transition when the state transition is permitted and does not adopt the state transition when the state transition is not permitted (S3).

As is clear from the above description, simulated annealing has wide applicability and is a very advantageous method. However, since the temperature is slowly lowered, there is the problem that the calculation time is comparatively long. In addition to this problem regarding the lowering of temperature, there is the problem that it is difficult to make appropriate adjustments. This will now be described with reference to FIG. 17.

On a path from the initial state to an optimal solution or an approximate solution, there will be many local minimums that are poor approximations. To escape from these local minimums sufficiently quickly, the temperature needs to be high enough for sufficient thermal excitation. At high temperatures however, the energy spread in a Boltzmann distribution is large, so that the difference in occupation probability between an optimal solution or a good approximate solution with a low energy (hereinafter simply referred to as a "good solution") and the local minimum that is a poor approximation with a relatively high energy (hereinafter simply referred to as a "poor solution") is small. For this reason, even when it is possible to escape from a local minimum, the escaped-to destination will be distributed among the many other poor solutions, so that the probability of reaching a good solution is very low. To increase the occupation probabilities of good solutions, a low temperature where the thermal excitation energy becomes sufficiently low compared to the difference in energy from a poor solution is preferable. However, since the thermal excitation energy is low, the probability of overcoming energy peaks on the route is very low, resulting in state transitions hardly occurring. Accordingly, the occupation probabilities of good solutions are gradually increased by providing some ability to overcome peaks and slowly passing through intermediate temperatures where some difference in occupation probability is produced. When the temperature is lowered too slowly, there will be little reduction in temperature in a given period, so that the occupation probabilities of good solutions will ultimately not improve. Conversely, when the temperature is lowered too rapidly, the temperature will fall before an escape is made from the local minimum and the system will be trapped at a poor solution. Accordingly, the further the temperature has fallen, the smaller the changes to be made in temperature to provide sufficient time to reach a Boltzmann distribution for that temperature.

With conventional simulated annealing, to escape from a local minimum using only thermal excitation due to temperature, it is desirable to slowly lower the temperature and to make appropriate adjustments to how the temperature is lowered in keeping with the problem to be optimized.

Note that when searching for a procedure by repeatedly generating and evaluating image processing procedures that input original images and sample images to be recognized and perform recognition, there is a technique that uses simulated annealing with a taboo list for preventing solutions that have been searched from being re-evaluated.

There is also a technique that implements a Boltzmann machine with a function that performs temperature control and calculates changes in energy. See, for example, the following documents.

Japanese Laid-open Patent Publication No. 2005-258609
Japanese Laid-open Patent Publication No. 2001-250102
Christian R. Schneider et al., "Analog CMOS Deterministic Boltzmann Circuits" JSSC, VOL. 28, No. 8, pp. 907-914, August 1993

As described above, the long time taken to escape from local minimums is a major cause of prolonging of the calculation time of simulated annealing. Also, even when a state transition is performed to escape from a local minimum, it is not possible to fully escape from the local minimum with one state transition and the risk of a return to the prior state remains, which is also a factor in the long time taken to escape from local minimums.

SUMMARY

According to one aspect, there is provided an optimization apparatus including: a state holding unit that holds values of a plurality of state variables included in an evaluation function that represents energy; an energy calculating unit that calculates an energy change of the energy for each of a plurality of state transitions that occurs when a value of at least one out of the plurality of state variables changes; a temperature control unit that controls a temperature; and a transition control unit that adds an offset to each energy change when stochastically deciding, based on the temperature, the energy change, and a random number relating to thermal excitation, whether to accept any of the plurality of state transitions according to a relative relationship between the energy change and thermal excitation energy, performs control so that the offset at a local minimum where the energy is locally minimized is larger than an offset when the energy is not minimized, holds first transition information indicating a previous state transition, and prohibits a first state transition out of present state transition candidates based on a first decoding result of the held first transition information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 depicts one example of a truth table of a logic circuit that generates a pulse signal;

DESCRIPTION OF EMBODIMENTS

Figure 1:
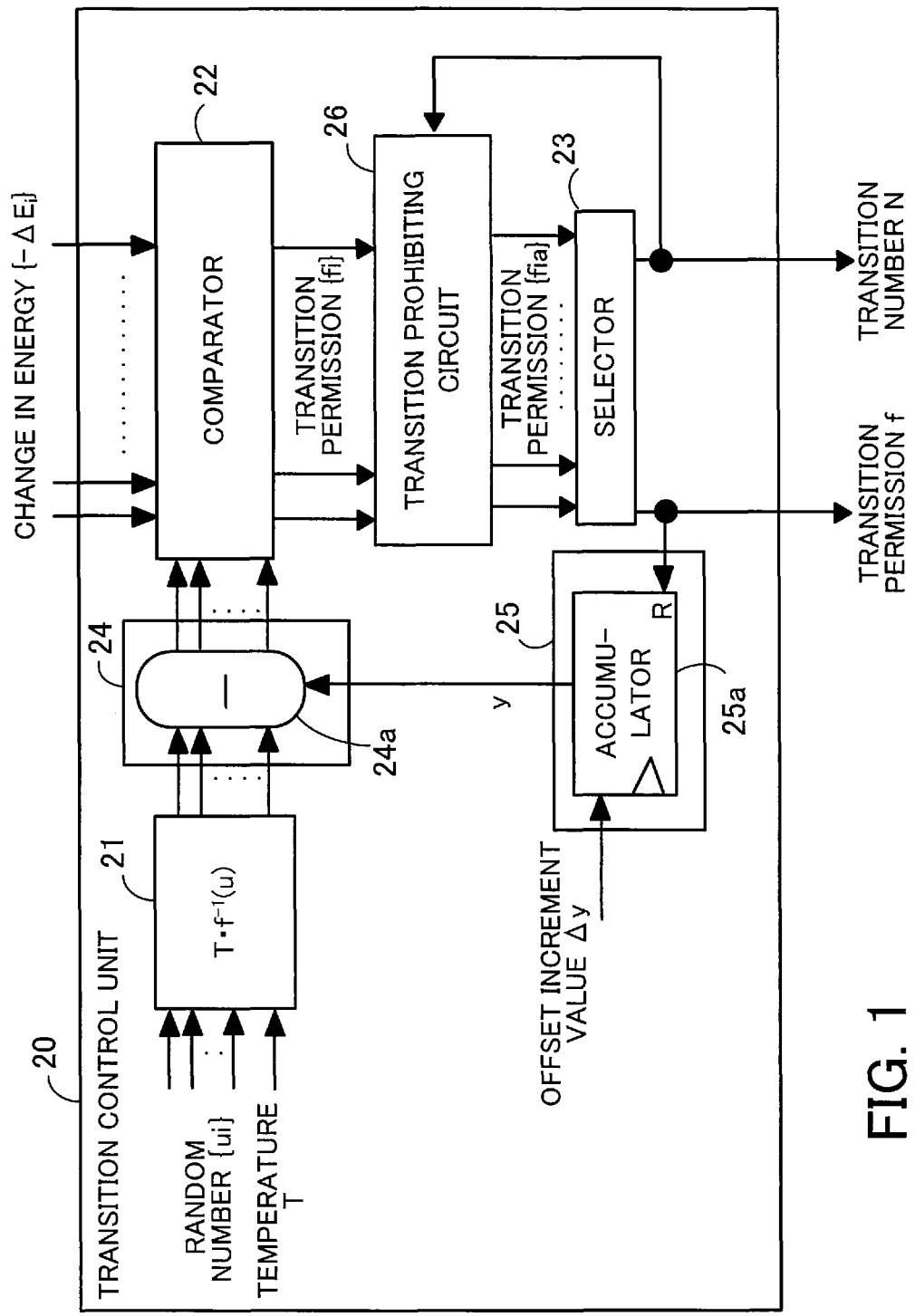
FIG. 1 depicts one example of a transition control unit of an optimization apparatus according to a first embodiment.

Several embodiments will be described below with reference to the accompanying drawings, wherein like reference numerals refer to like elements throughout.

First Embodiment

FIG. 1 depicts one example of a transition control unit of an optimization apparatus according to the first embodiment. Although the transition control unit 20 in FIG. 1 is described below as setting every change in the values of various state variables as a candidate for a state transition, it is also possible to set only some changes in the values of various state variables as candidates for a state transition. Also, in the following description, although the random numbers used for thermal excitation are independent of the various transition candidates, the random numbers may be common to some state transition candidates.

Figure 15:
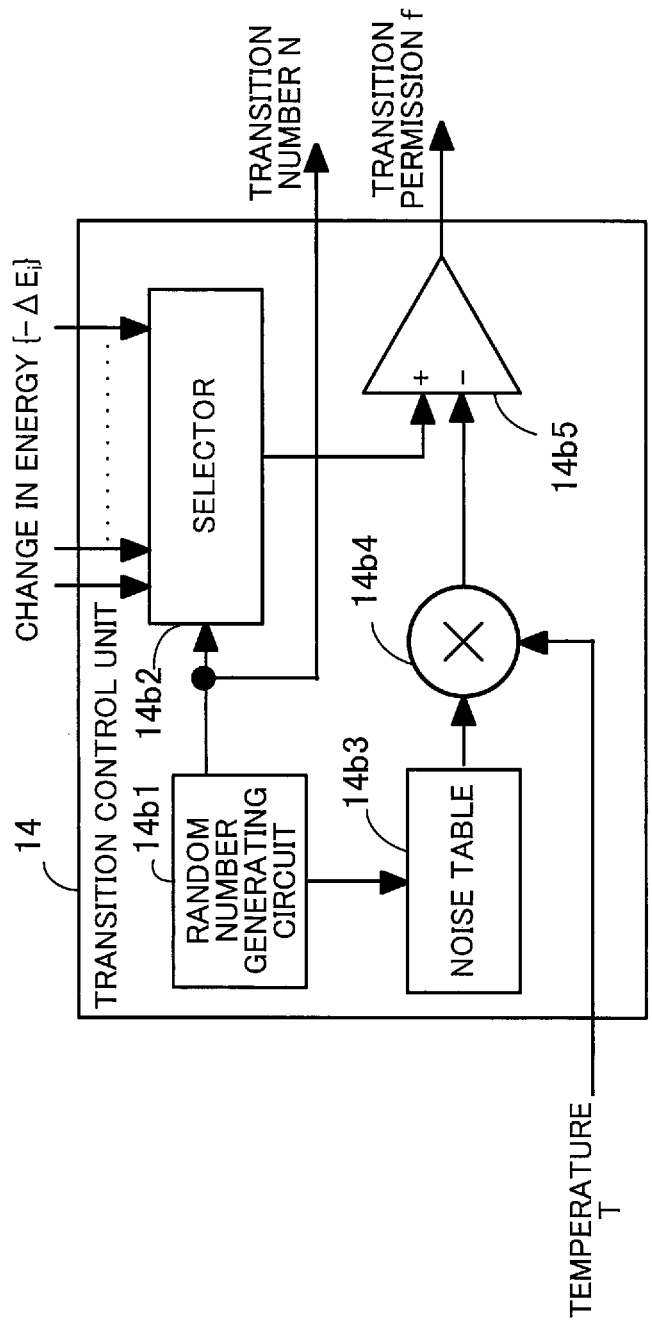
FIG. 15 is a circuit-level block diagram of an example configuration of a computing portion used for a transition control unit, and in particular a transition assessor, according to a conventional example.
Figure 16:
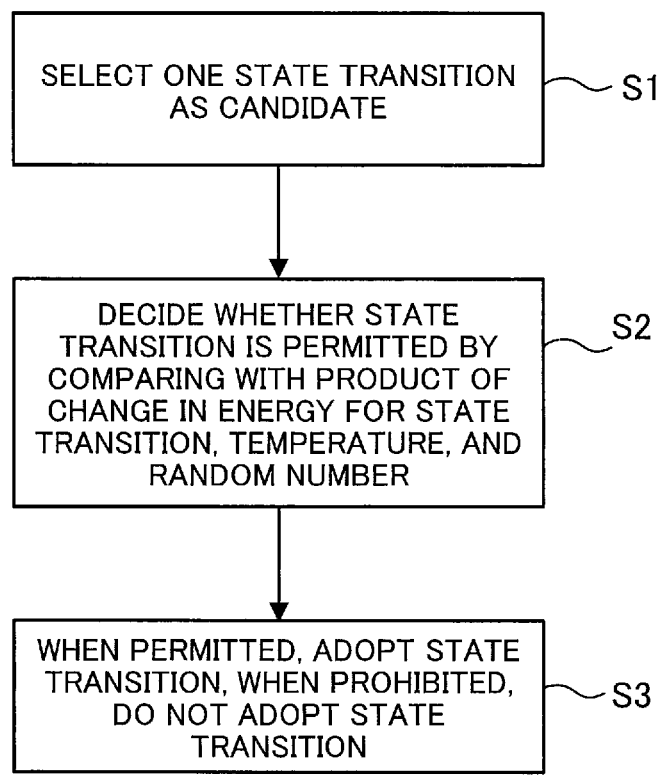
FIG. 16 depicts an operation flow of a transition control unit according to a conventional example.
Figure 17:
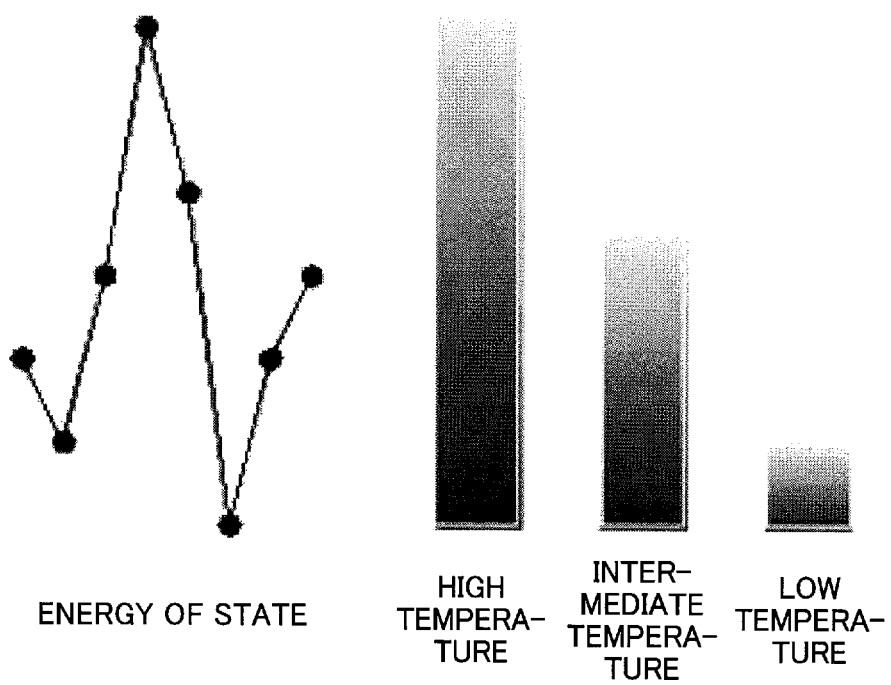
FIG. 17 depicts the concept of occupation probabilities of states when pseudo random numbers are used.

The transition control unit 20 includes an offset adding circuit 24, an offset control circuit 25, and a transition prohibiting circuit 26 in addition to a circuit (composed of a thermal excitation energy generating unit 21, a comparator 22, and a selector 23) that realizes the same functions as the transition control unit 14 depicted in FIG. 15. Note that a circuit that generates random numbers like the transition control unit 14 depicted in FIG. 15 has been omitted from FIG. 1.

The thermal excitation energy generating unit has a noise table (or "storage unit") that converts random numbers {ui} that are independent for each transition candidate to values of the inverse function $f^{-1}(u)$ described earlier. The thermal excitation energy generating unit 21 outputs a product obtained by multiplying a value outputted by the noise table by the temperature T as a threshold of thermal excitation energy in the Metropolis method or the Gibbs method.

The offset adding circuit 24 has a function that adds an offset y to the change in energy (−ΔE) that accompanies a state transition. In the example in FIG. 1, the offset adding circuit 24 is a subtractor 24a. This means that although the example in FIG. 1 is configured to subtract the offset y from the thermal excitation energy threshold generated for each transition candidate instead of adding the offset y to the change in energy (−ΔE), both methods (i.e., adding and subtracting) are effectively the same.

The offset control circuit 25 performs control to increase the offset y at local minimums (i.e., solutions where the energy has a minimum value) compared to other states that are not local minimums. In the example in FIG. 1, the offset control circuit 25 is an accumulator 25a that has a reset terminal R. The accumulator 25a sets the offset y at zero when the transition permission value f inputted into a reset terminal R indicates that a state transition is permitted (that is, when a state transition happens). The accumulator 25a has an input terminal and a clock terminal. When the transition permission value f indicates that a state transition is not permitted (that is, when a state transition does not occur), the accumulator 25a adds an offset increment value Δy inputted into the input terminal to the offset y every time a pulse value, not illustrated, is inputted into the clock terminal.

Note that the pulse value, not illustrated, is supplied for example by a state machine, described later. As one example, the offset increment value Δy is stored in a register, not illustrated.

The comparator 22 compares the output value of the offset adding circuit 24 (that is, the subtraction result outputted by the subtractor 24a) and the change in energy {−ΔE$_i$} corresponding to that output value and outputs the transition permission value {fi} that is a judgment result indicating whether each state transition is to be accepted (i.e., whether each state transition is permitted). Note that the operation of the comparator 22 corresponds to outputting comparison results for comparisons of sums of the change in energy {−ΔEi} calculated for each of a plurality of state transitions and the offset y with a plurality of products (thermal excitation energies).

The transition prohibiting circuit 26 stores transition information (a transition number N) indicating the most recent (i.e., previously occurring) state transition and prohibits a state transition (i.e., a state transition that restores the most recent state) based on a decoding result of the stored transition number N. In the example in FIG. 1, out of the transition permission values {fi} that are a plurality of judgment results indicating whether respective state transitions are to be accepted, the transition prohibiting circuit 26 outputs transition permission values {fia} that are produced by setting the transition permission value corresponding to transition information indicating the previous state transition at a value indicating that this state transition is not permitted. By doing so, a situation where the same state variable continually changes is avoided and state transitions that return to the most recent state do not happen.

The selector 23 uses a random number to randomly select one out of a plurality of state transitions and outputs a transition permission value f indicating whether the selected state transition is to be accepted based on the transition permission values {fia}. The selector 23 also outputs the transition number N indicating the selected state transition. In the following description, when the transition permission value f is 1, this indicates that a state transition is permitted, while when the transition permission value f is 0, this indicates that a state transition is not permitted.

An example operation of the transition control unit 20 described above will now be described.

In each iteration described earlier, the thermal excitation energy generating unit 21 receives a number of independent random numbers {ui} that is equal to the number of state transition candidates and converts these values to values of the inverse function f$^{-1}$(u) using the noise table. The thermal excitation energy generating unit 21 then multiplies the values produced by conversion by a common temperature T to generate the thermal excitation energy threshold in the Metropolis method or the Gibbs method.

The subtractor 24a subtracts the offset y outputted from the accumulator 25a from the thermal excitation energy threshold generated for each transition candidate, and the comparator 22 compares the respective subtraction results outputted by the subtractor 24a with the change in energy {−ΔE$_i$}. Based on the comparison results, the comparator 22 outputs the transition permission values {fi} indicating whether each state transition is possible.

When, in the transition permission values {fi}, the transition permission value corresponding to a state variable that changed in the previous iteration indicates "permitted", the transition prohibiting circuit 26 outputs transition permission values {fia} where the state transition in question has been set at "prohibited". The selector 23 uses a random number to randomly select one out of the plurality of state transitions and outputs the transition permission value {fia} of the selected state transition as the transition permission value f. When a state transition is permitted, the transition permission value f is set at 1, and when a state transition is prohibited, the transition permission value f is set at 0. The selector 23 also outputs the transition number N indicating the selected state transition.

When the transition permission value f is 1, the offset y is reset to zero by the accumulator 25a. When the transition permission value f is zero, by adding the offset increment value Δy to the offset y, the accumulator 25a performs control so that the offset y monotonically increases with respect to the duration in the present state.

Since all of the state transitions are treated as candidates and a state transition will occur almost every time in one iteration when the current state is not a local minimum, it would be conceivably possible to set the offset increment value Δy at a level where a duration of several iterations or so will be enough to reach the energy for escaping from the local minimum.

Figure 2:
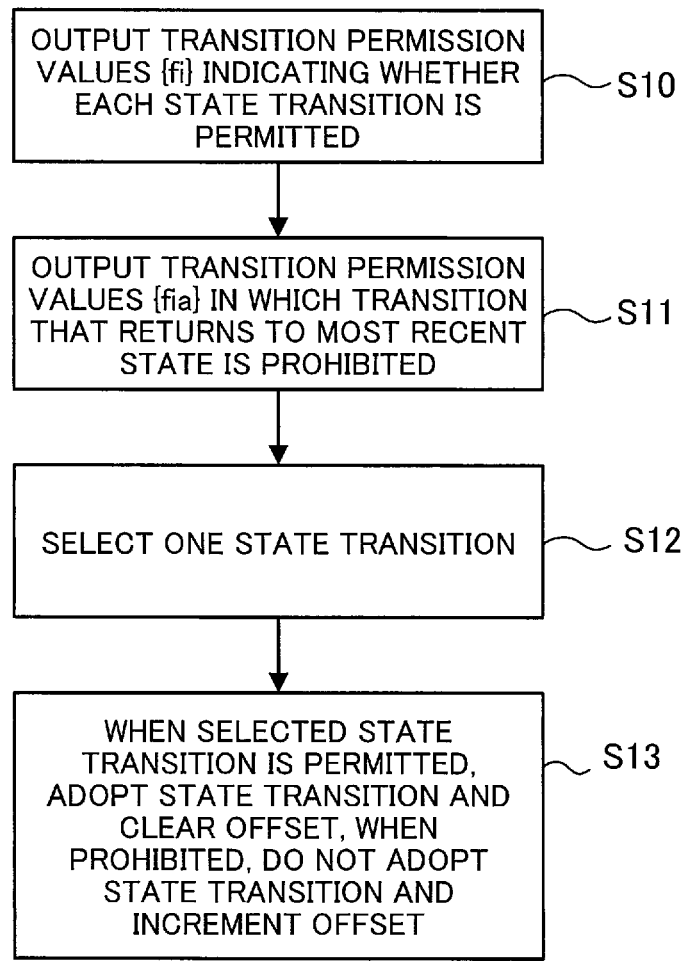
FIG. 2 depicts the operation flow of a transition control unit of the optimization apparatus according to the first embodiment.

FIG. 2 depicts the operation flow for judging whether a state transition is possible.

The operation flow includes a step (S10) where the comparator 22 performs the processing described above to output transition permission values {fi} indicating whether each state transition is permitted and a step (S11) where the transition prohibiting circuit 26 outputs the transition permission values {fia} in which a state transition that returns to the most recent state is prohibited. The operation flow also includes a processing step (S12) where the selector 23 randomly selects one out of a plurality of state transitions and a step (S13) that adopts a state transition and clears the offset y when the selected state transition is permitted, but does not adopt the state transition and increments the offset y when the selected state transition is prohibited.

The other operations may be the same as regular simulated annealing.

Next, before describing the effect of the transition control unit 20 that includes the offset adding circuit 24, the offset control circuit 25, and the transition prohibiting circuit 26 described above, a transition control unit that does not include the transition prohibiting circuit 26 will be described as a comparative example.

COMPARATIVE EXAMPLE

Figure 3:
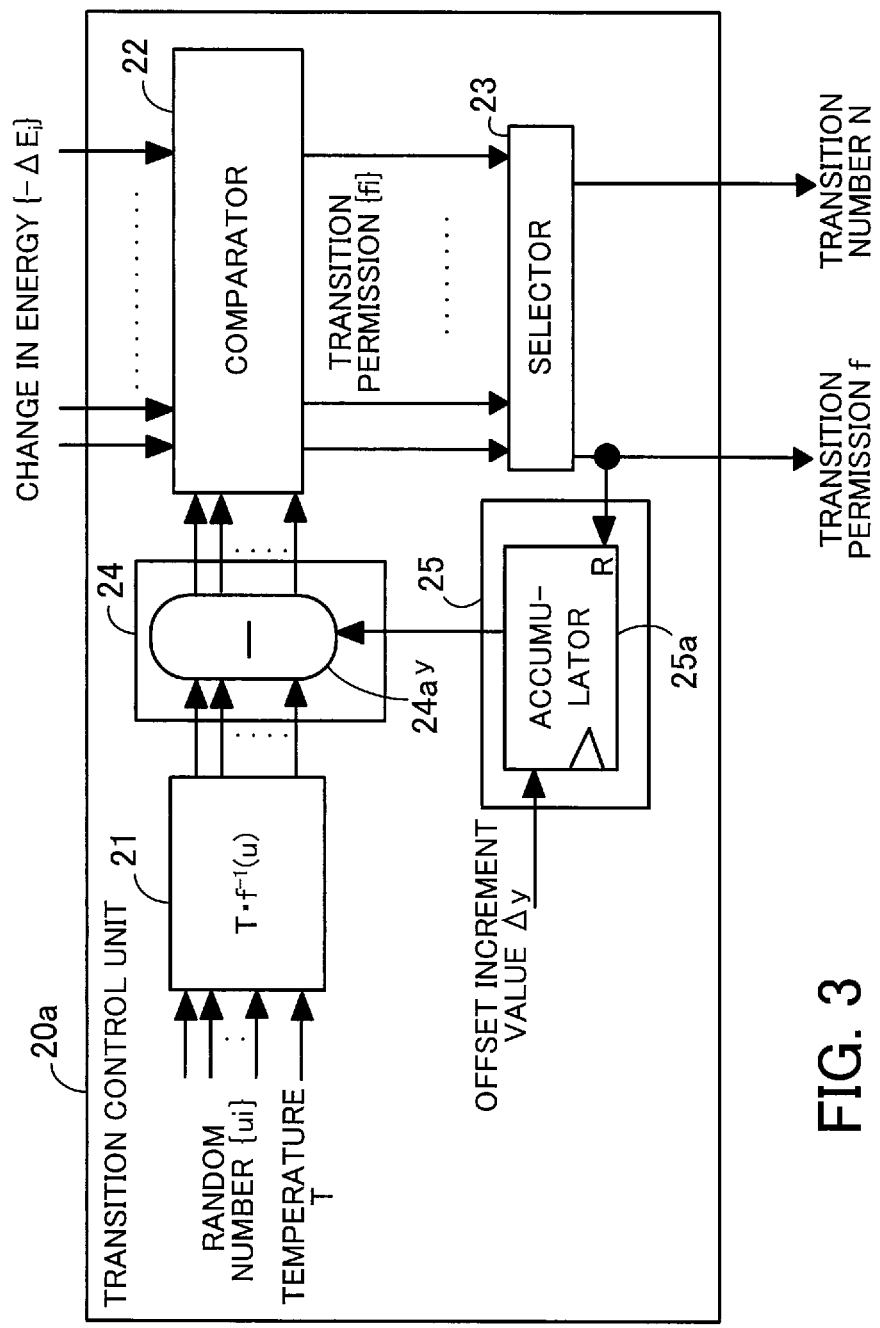
FIG. 3 depicts a transition control unit that does not include a transition prohibiting circuit.

FIG. 3 depicts a transition control unit that does not include a transition prohibiting circuit.

The transition control unit 20a does not include the transition prohibiting circuit 26 depicted in FIG. 1. For this reason, the transition permission values {fi} outputted by the comparator 22 are supplied without amendment to the selector 23.

However, since the transition control unit 20a includes the offset adding circuit 24 and the offset control circuit 25 described earlier, the following effect is obtained.

When the present state is caught at a local minimum from which it is difficult to escape, the change in energy for every state transition will be a large positive value. As depicted in Expressions 4-1 and 4-2 below, for both the Metropolis method and the Gibbs method, the permission probability of each state transition at this time is approximately equal to an exponential function.

$$f_{metro}(x) \approx e^x (x<<-1) \quad (4\text{-}1)$$

$$p(\Delta E, T) \approx e^{-\Delta E/T} (\Delta E >> T) \quad (4\text{-}2)$$

When the judgment of whether every state transition is permitted or prohibited is performed after first adding the offset y to the change in energy $\{-\Delta E_i\}$, the permission probability of each state transition is given by Expression 5 below. It is therefore understood that the permission probability of every state transition increases by the same multiple $e^{y/T}$.

$$\tilde{p}(\Delta E_i, T) = p(\Delta E_i - y, T) \approx e^{(-\Delta E_i + y)/T} = e^{y/T} p(\Delta E_i, T) \quad (5)$$

As described earlier, when the absolute values of the permission probability increase while the relative magnitudes of the permission probabilities of all of the state transitions are maintained, it is possible to reduce the duration spent at a local minimum without changing the branching ratios of subsequent state transitions. This means that use of the offset y is expected to promote escape from local minimums. However, unless the offset y is appropriately controlled, there are the risks of an insufficient effect in accelerating escape and of deterioration in convergence.

First, when the present state is not a local minimum, there will be a state transition that lowers the energy, so that it is not possible to approximate the transition probability with an exponential function. This means that the branching ratios will change when there is an offset y. For this reason, when the state is not a local minimum, it is preferable for the offset y to be zero or a sufficiently low value.

When the present state is a local minimum but the offset y is a fixed value, there will be an accelerating effect but not necessarily an effect that is sufficient. When the increase in energy caused by every state transition is large, the transition probabilities will remain very low even when an offset y is added. When it is not possible to escape from a local minimum in spite of an offset y being added, it is desirable to use a larger offset y.

To handle this situation, the offset control circuit 25 in FIG. 1 is configured to gradually increase the offset y when a state transition does not occur and to reset the offset y to zero when a state transition occurs.

Since the offset y gradually increases when the state remains at a local minimum, it will eventually become possible to escape. Also, when the state is not a local minimum, resets due to state transitions will frequently occur, resulting in the offset y being zero or a low value, which makes it possible to avoid having a large influence on the branching ratios.

It is also preferable to appropriately select the offset increment value Δy. Large values of the offset increment value Δy make it possible to quickly escape from a local minimum. However, when the offset increment value Δy is too large, since there is no guarantee that a state transition will occur every time even when the present state is not a local minimum, the branching ratios may be affected by the offset y. Also, even at a local minimum, there is the risk of the offset y increasing before state transitions that have relatively low increase in energy and a high permission probability become candidates, which may skew the branching ratios from the correct values. To avoid having a large effect on the branching ratios, it is thought advantageous for the average duration at a local minimum to be around several times the average duration in a state that is not a local minimum.

For the reasons given above, it is known that when the offset increment value Δy is appropriately selected, it is possible to reduce the duration at a local minimum without having an adverse effect on convergence and possible to reduce the calculation time taken by optimization.

However, even when escape from a local minimum is promoted by the offset adding circuit 24 and the offset control circuit 25 and a state transition that is intended to promote escape from the local minimum is performed, there is still the risk that it will not be possible to fully escape from the local minimum with one state transition and there will be a return to the original state.

Figure 4:
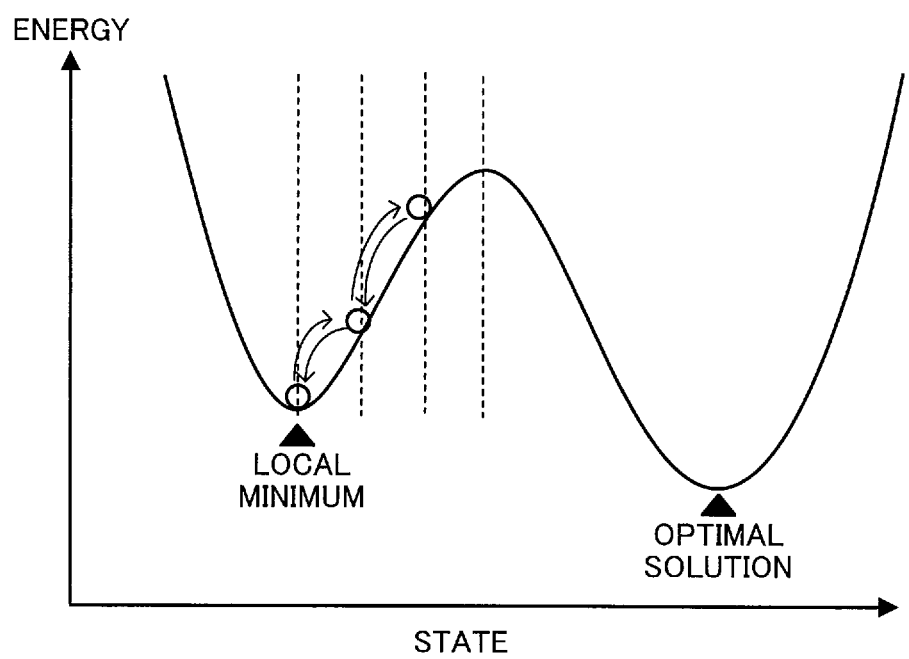
FIG. 4 depicts one example of state transitions when a transition control unit that is a comparative example has been used.

FIG. 4 depicts one example of state transitions when the transition control unit that is the comparative example has been used. The vertical axis in FIG. 4 represents energy and the horizontal axis represents states (i.e., combinations of values of the state variables).

As depicted in FIG. 4, many optimization problems involve a plurality of state transitions in a direction where the energy increases in order for the state to escape from a local minimum and reach the optimal solution. When the transition control unit 20a of the comparative example is used, although it becomes easier for state transitions in a direction where the energy increases to occur, since the offset y is reset to zero when a state transition occurs, state transitions in a direction where the energy increases further are not promoted. For this reason, in most cases, there will soon be a return from a state where the energy has increased back to the original state. As a result, there is the risk of a very long time being taken to cross the peaks in the potential and reach the optimal solution.

Figure 5:
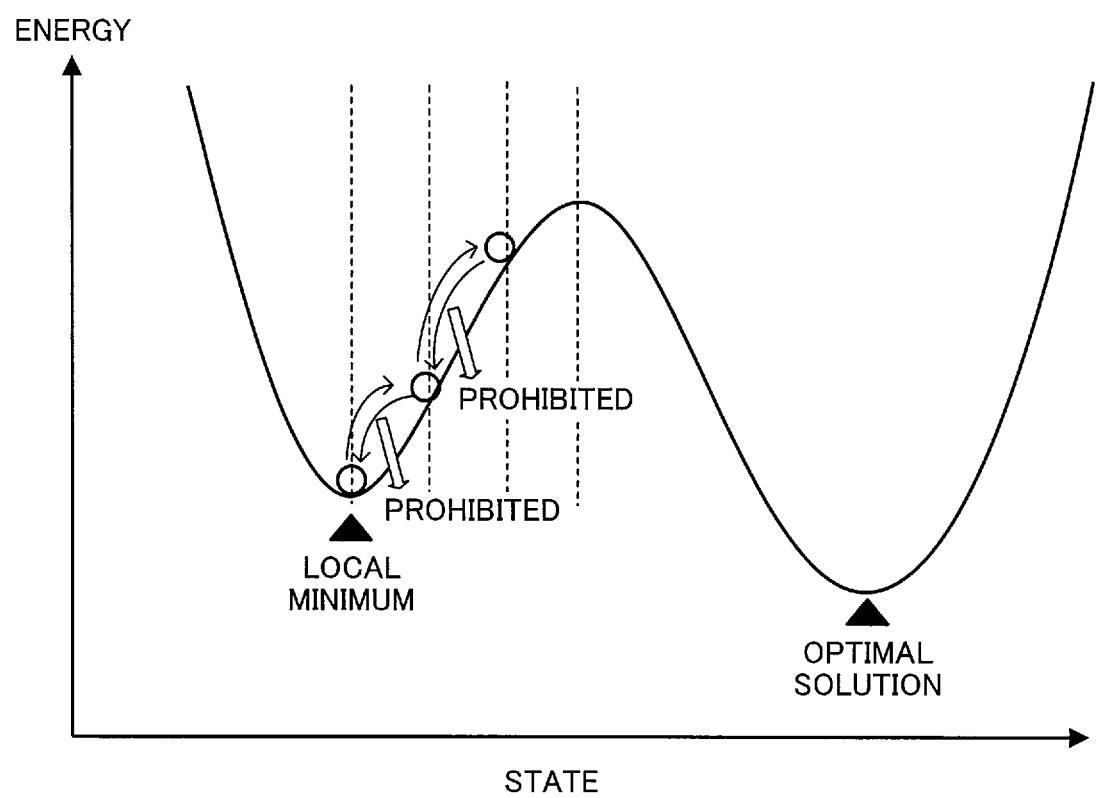
FIG. 5 depicts one example of state transitions when the transition control unit according to the first embodiment is used.

FIG. 5 depicts one example of state transitions when the transition control unit according to the first embodiment is used. The vertical axis in FIG. 5 represents energy and the horizontal axis represents states (i.e., combinations of values of the state variables).

With the transition control unit 20 in FIG. 1, a state transition that returns to the most recent state as depicted in FIG. 4 is prohibited by the functions of the transition prohibiting circuit 26 described above, so that the state either remains in the present state (i.e., a state transition does not occur) or a state transition occurs in a direction where the energy increases.

By doing so, by using the transition control unit 20, it becomes easy to escape from local minimums and possible to reduce the calculation time taken by optimization problems compared to a case where the transition control unit 20a of the comparative example is used. Note that with simulated annealing, although it is not possible to satisfy a condition that easily proves convergence when certain state transitions are prohibited, this does not necessarily mean that there is deterioration in convergence (see the verification by software simulation described later in this specification).

Note that although the transition prohibiting circuit 26 is provided between the comparator 22 and the selector 23 in the example in FIG. 1, the position of the transition prohibiting circuit 26 is not limited to this and the transition prohibiting circuit 26 may be provided downstream of the selector 23. Here, the transition prohibiting circuit 26 prohibits state transitions that return to the most recent state by setting the transition permission value f at zero when the transition number N is the same as the previous transition number N.

However, by being provided between the comparator 22 and the selector 23 like in FIG. 1, the transition prohibiting circuit 26 is capable of avoiding a fall in the transition probability. When the transition prohibiting circuit 26 is provided downstream of the selector 23, the transition permission value f becomes zero when the transition number N is the same as the previous transition number N to prevent a state transition of any of the state variables.

Note that the transition prohibiting circuit 26 may also prohibit changes to state variables that changed in a previous-but-one (or even earlier) state transition, not only state variables that changed in the immediately previous state transition.

Figure 14:
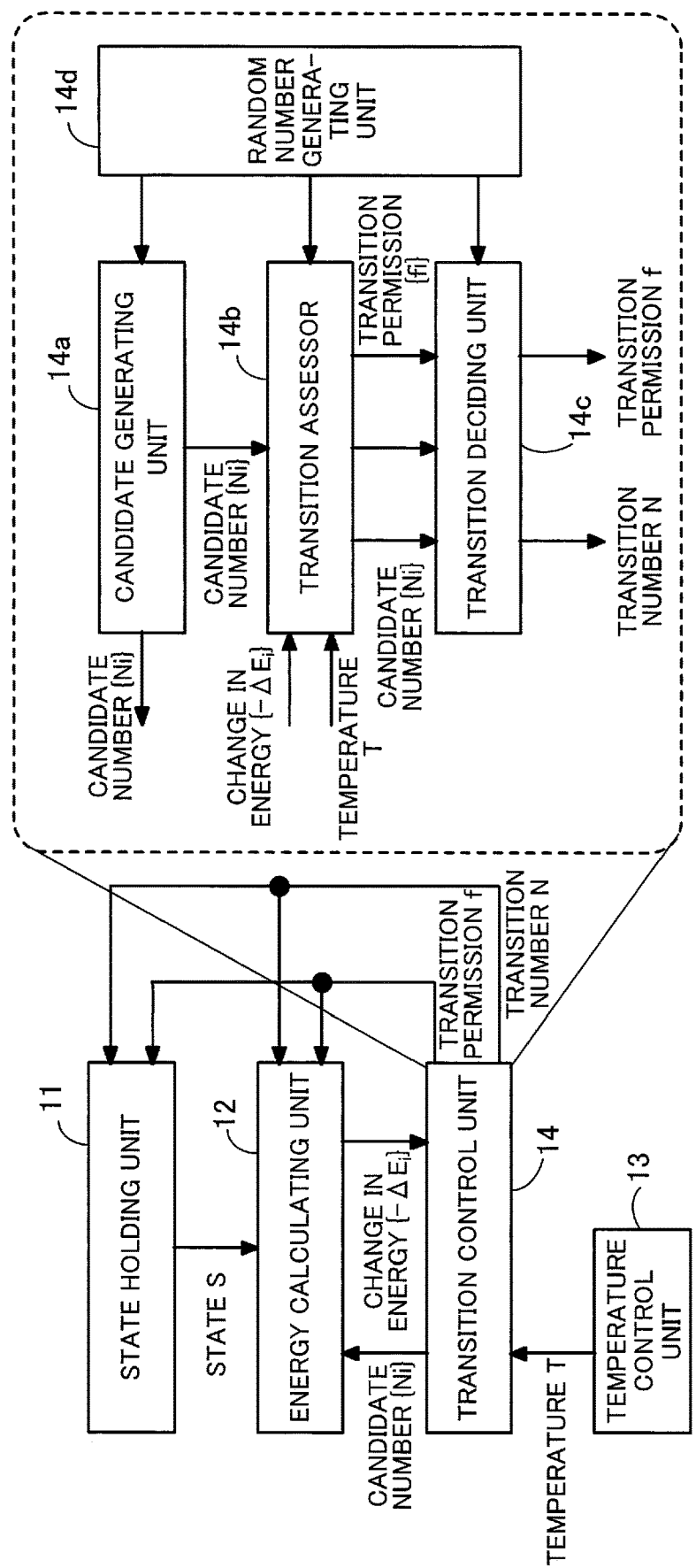
FIG. 14 depicts a conceptual configuration of an optimization apparatus that uses simulated annealing.

The optimization apparatus according to the present embodiment adds new component elements as depicted in FIG. 1 to the transition control unit 14 depicted in FIG. 14 that realizes simulated annealing as described above, and by doing so shortens the calculation time. It is unnecessary to make changes to other parts. Accordingly, it is possible to use an optimization apparatus with the transition control unit 20 described above completely independently of the set of state transitions that may be permitted for the present state, the type of function that calculates changes in energy caused by a state transition, and/or the method of calculating the function. Accordingly, detailed description of specific circuit configurations and the like of these parts is omitted here.

A method of generating transition candidates and computing changes in energy that accompany state transitions will now be described in brief for simulated annealing in a case where the energy to be optimized is expressed by an Ising model and optimization with a Boltzmann machine which is almost equivalent to simulated annealing.

An Ising model is a model expressing a system composed of N spins that interact with each other, and each spin $s_i$ is in one of two states, +1 or −1. The energy of the system is expressed by Expression 6 below.

$$E = \frac{1}{2}\sum_{i,j} J_{i,j} s_i s_j + \sum_i h_i s_i \tag{6}$$

In Expression 6, $J_{i,j}$ represents the interaction coefficient between spin $s_i$ and spin $s_j$ and $h_i$ represents an external magnetic field coefficient that is a bias field for the spin.

Candidates for a state transition from the present state to the next state are composed of the inversion of one spin, and have N patterns. Accordingly, as the transition candidates, it is possible to generate single spin numbers or a set of a plurality of spin numbers to be inverted.

The change in energy that is caused by inversion of the $i^{th}$ spin is expressed by Expression 7 below.

$$\Delta E_i = -2s_i \frac{\partial E}{\partial s_i} = -2s_i \left( \sum_j J_{i,j} s_j + h_i \right) \tag{7}$$

Here, $F_i$ in Expression 8 below is referred to as the "local field" and expresses the ratio of the change in energy due to the inversion of each spin.

$$F_i = \sum_j J_{i,j} s_j + h_i \tag{8}$$

Since the decision of whether to permit a state transition is made based on the change in energy, it is fundamentally sufficient to calculate the change in energy from the local field without calculating the energy itself. When a state with the lowest obtained energy is used as an output, it is possible to calculate the energy by calculating changes in energy from the local field and summing the changes.

In addition, $$\frac{\partial}{\partial s_j} F_i = J_{i,j} \tag{9}$$

Since the above, it is unnecessary to recalculate the local field every time using matrix computation, and it is sufficient to add the change caused by the spin that was inverted due to a state transition. This means that it is possible to realize the state holding unit 11 depicted in FIG. 14 using an N-bit register that stores the values of the N spins and a relatively simple computation circuit, such as an adder or a logical exclusive OR (XOR) circuit.

Aside from the state variables taking the two values 0 and 1, a Boltzmann machine used in a neural network is the same as simulated annealing by an Ising model. This means that it is possible to use almost the same configuration. Energy, the change in energy, and the local field are expressed as indicated in Expression 10, Expression 11, and Expression 12 below.

$$E = \frac{1}{2}\sum_{i,j} J_{i,j} s_i s_j + \sum_i h_i s_i \tag{10}$$

$$\Delta E_i = (1 - 2s_i)\frac{\partial E}{\partial s_i} = (1 - 2s_i)\left( \sum_j J_{i,j} s_j + h_i \right) \tag{11}$$

$$F_i = \sum_j J_{i,j} s_j + h_i \tag{12}$$

Note that although the element in a Boltzmann machine that corresponds to "spin" in an Ising model is often referred to as a "neuron", the expression "spin" is used below to simplify explanation.

As described above, since simulated annealing using an Ising model and simulated annealing using a Boltzmann machine are the same and may be interconverted, the following description imagines a Boltzmann machine where it is easy to establish correspondence with the zeros and ones of logic circuits.

Note that with a Boltzmann machine (and simulated annealing of an Ising model), only one state variable changes in accordance with a state transition and it is possible to calculate the change in energy corresponding to this in advance using local field. Accordingly, in the embodiment described below, implementation of a method that selects, in response to the generation of transition candidates, changes in energy that have been calculated in advance will be described as an example. For a configuration that does not use a Boltzmann machine however, transitions where a plurality of state variables change are also considered and it may be advantageous to perform calculation of the changes in energy on demand after transition candidates are generated.

Second Embodiment

Figure 6:
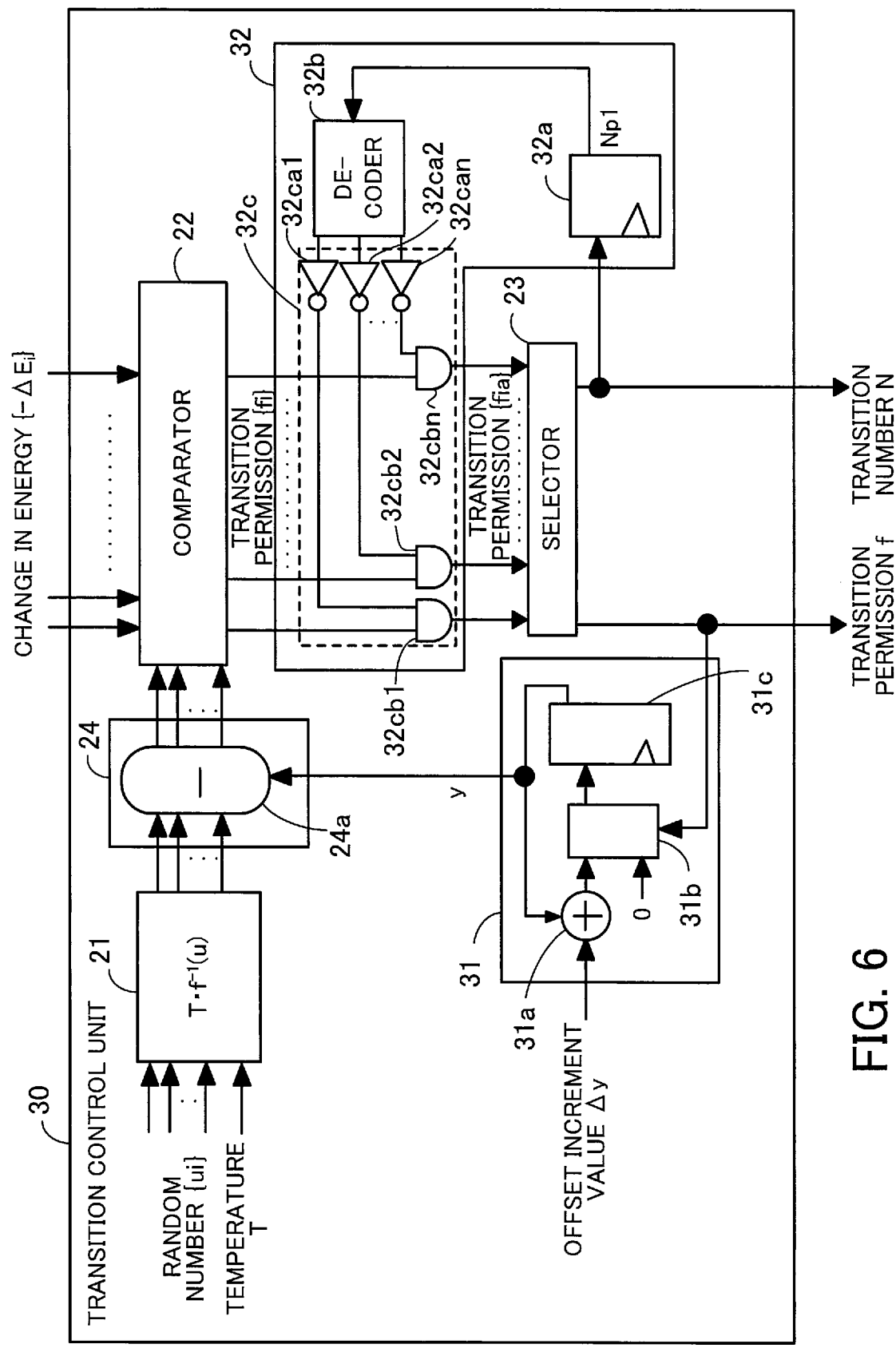
FIG. 6 depicts one example of a circuit configuration of a transition control unit in an optimization apparatus according to a second embodiment.

FIG. 6 depicts one example of a circuit configuration of a transition control unit in an optimization apparatus according to a second embodiment. Elements that are the same as the transition control unit depicted in FIG. 1 have been assigned the same reference numerals. Although a transition control unit 30 in FIG. 6 is fundamentally the same as the transition control unit 20 in FIG. 1, an accumulator 31 and a transition prohibiting circuit 32 are depicted at the circuit level.

Note that in FIG. 6 also, a circuit that generates random numbers is omitted from the drawing. Although the following description assumes that the transition control unit 30 treats every change (or "one-bit flips" (i.e., an one-spin change in the spin value)) to the respective state variables (hereinafter referred to as "bits") as a candidate for a state transition, it is also possible to set only some bit inversions as candidates for a state transition. Also although the random numbers used for thermal excitation are assumed to be independent of the various transition candidates in the following description, the random numbers may be common to a number of state transition candidates.

The accumulator 31 includes an adder 31a, a selector 31b, and a register 31c.

The adder 31a outputs a sum produced by adding an offset increment value Δy and the offset y outputted by the register 31c.

When the transition permission value f is one, the selector 31b selects and outputs zero. When the transition permission value f is zero, the selector 31b selects and outputs the addition result outputted by the adder 31a.

The register 31c synchronizes a pulse signal supplied to a clock terminal, fetches a value outputted by the selector 31b, and outputs as the offset y.

The bit width of the adder 31a and the register 31c is set as appropriate. The bit width may be approximately equal to the bit width of the change in energy (−ΔE). As one example, since the change in energy (−ΔE) has a maximum of 27 bits when the bit width of the interaction coefficient is 16 and the spin number is 1024, it is sufficient to use this as the bit width. In reality however, it is sufficient in most cases to use a shorter bit width. The bit width of the outputs of the noise table of the thermal excitation energy generating unit 21 may also be about the same as the bit width of the change in energy (−ΔE) or shorter.

The pulse signal supplied to the clock terminal of the register 31c is supplied by a state machine that controls iterative operations in a circuit operation, and is controlled to become active for a single operation after the permission of a state transition has been established in one iteration.

Since the number of cycles of a clock signal used to make a judgment of permission and to subsequently update various parameters will change according to the permission judgment result, the pulse signal is also generated so as to match the number of cycles.

A method of generating a pulse signal is described below for an example case where the next iteration starts in five cycles when there has been an updating of the state and in one cycle when there is no updating.

Figure 7:
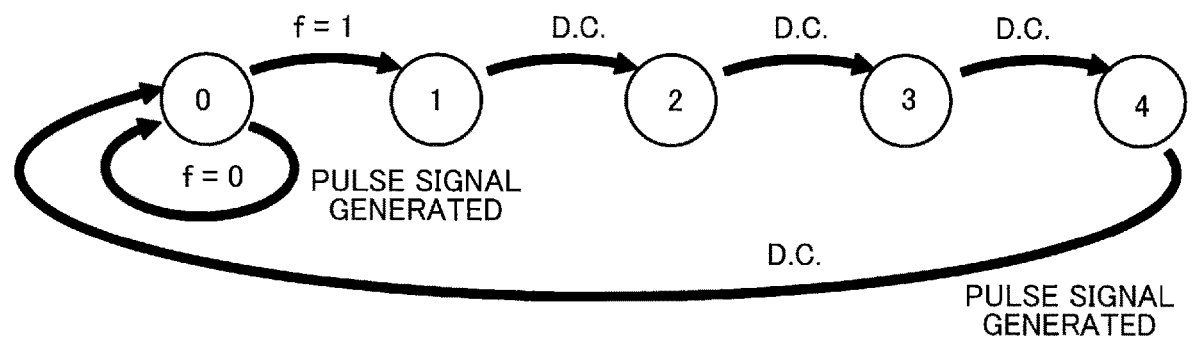
FIG. 7 is a state transition diagram indicating examples of state transitions where pulse signals are generated.

FIG. 7 is a state transition diagram indicating examples of state transitions where pulse signals are generated.

As depicted in FIG. 7, state transitions are performed between five states numbered 0 to 4. When the transition permission value f is 0 during state 0, a pulse signal is generated. In this case, a state transition from state 0 is not performed. When the transition permission value f is 1 during state 0, there is a state transition to state 1. In FIG. 7, the letters "D.C." are an abbreviation of "Don't Care". That is, from state 1, irrespective of the value of the transition permission value f, there are state transitions from state 1 to state 2, state 3, and state 4 and then a return to state 0 in synchronization with the clock signal CLK. A pulse signal is also generated when there is a return from state 4 to state 0.

A state machine for realizing the state transitions described above may be a circuit that satisfies the following truth table.

FIG. 8 depicts one example of a truth table of a logic circuit that generates a pulse signal.

Figure 9:
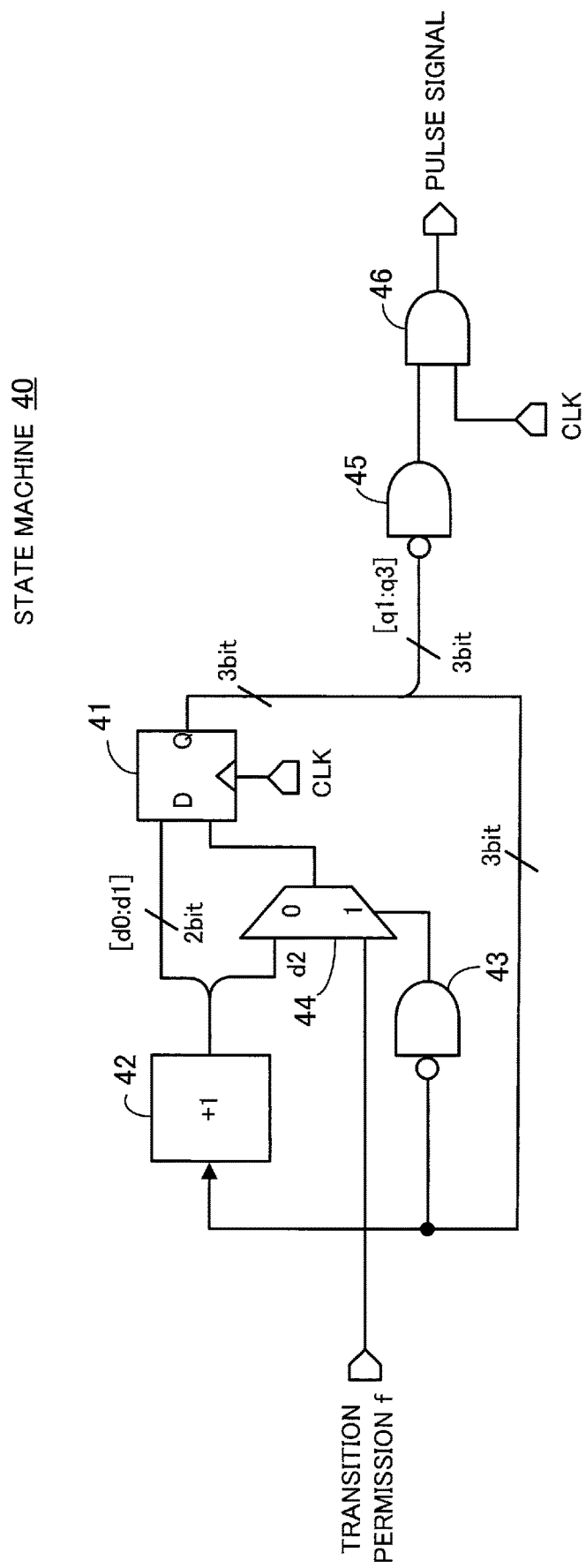
FIG. 9 depicts one example of a state machine that generates a pulse signal.

FIG. 9 depicts one example of a state machine that generates a pulse signal.

The state machine 40 includes a three-bit flip-flop 41, an increment circuit 42, an AND circuit 43, a selector 44, and AND circuits 45 and 46. The truth table in FIG. 8 indicates the relationship between output values Q1, Q2, and Q3 and input values D1, D2, and D3 of the three-bit flip-flop 41 in the respective states.

The most significant two bits ([d0:d1]) out of the three-bit value outputted by the increment circuit 42 and the value outputted by the selector 44 are supplied to the three-bit flip-flop 41 as the input values D1 to D3. The three-bit flip-flop 41 fetches the input values D1 to D3 at timing that is synchronized with the clock signal CLK and outputs as the output values Q1 to Q3.

The increment circuit 42 increments the three-bit output values Q1 to Q3 outputted by the three-bit flip-flop 41 by one. As one example, when the output values Q1 to Q3 are "001" (that is, Q1=Q2=0, Q3=1) the increment circuit 42 outputs "010".

The AND circuit 43 inputs a value produced by inverting a logic level of each bit of the output value Q1 to Q3 and outputs a logic AND of the inverted bits as an output value.

The least significant bit (d2) of the three-bit value outputted by the increment circuit 42 is supplied to one input terminal of the selector 44 and the transition permission value f is supplied to the other input terminal. The selector 44 outputs the transition permission value f when the output value of the AND circuit 43 is one and outputs d2 when the output value of the AND circuit 43 is zero.

The AND circuit 45 inputs a value produced by inverting the logic levels of the respective bits of the three bits ([q1:q3]) of the output values Q1 to Q3 and outputs a logical AND of the inverted bits as an output value.

The AND circuit 46 calculates a logical AND between the clock signal CLK and the output value outputted by the AND circuit 45 and outputs as the pulse signal.

Using the state machine 40 described above, it is possible to generate the pulse signal.

The transition prohibiting circuit 32 in FIG. 6 includes a register 32a as an example of a holding unit that holds the transition number N, a decoder 32b, and a transition prohibiting unit 32c.

At timing that is synchronized with a clock signal, not illustrated, the register 32a fetches, stores and outputs the transition number N outputted by the selector 23. When the transition number N is in a range of 0 to 1024, the bit width of the register 32a is 10 bits. Note that in the following description, to distinguish from the transition number N outputted by the selector 23, the transition number outputted by the register 32a is indicated as the "transition number Np1".

The decoder 32b decodes the transition number Np1 outputted by the register 32a and outputs a decode signal for setting the transition permission value {fia} of the bit corresponding to the transition number Np1, out of the n bits, at zero.

When the transition numbers N, Np1 are 0 to 1024, the decoder 32b outputs a 1024-bit decode signal. As one example, out of the 1024 bits, the decoder 32b sets the bit of the decode signal corresponding to the transition number Np1 at zero and sets other bits of the decode signal at one.

Based on the decode signal, the transition prohibiting unit 32c sets the transition permission value {fia} of the bit corresponding to the transition number Np1 at zero. In the example in FIG. 6, the transition prohibiting unit 32c includes inverters 32ca1, 32ca2, . . . , 32can and AND circuits 32cb1, 32cb2, 32cbn. The respective inverters 32ca1 to 32can and the AND circuits 32cb1 to 32cbn are provided so as to respectively correspond to the n bits. As one example, the inverter 32ca1 and the AND circuit 32cb1 are associated with the first bit out of the n bits. The transition permission value {fi} of the first bit is inputted into one input terminal of the AND circuit 32cb1 and a decode signal for setting the transition permission value {fia} of the first bit at zero or one is inputted via the inverter 32ca1 into the other input terminal. The output signal of the AND circuit 32cb1 is outputted as the transition permission value {fia} of the first bit.

An example operation of the transition prohibiting circuit 32 will now be described.

When the transition number N previously outputted by the selector 23 is 2, the register 32a outputs 2 as the transition number Np1. At this time, the decoder 32b supplies one to the inverter 32ca2 out of the inverters 32ca1 to 32can and supplies zero to the other inverters. By doing so, the output signal of the AND circuit 32b2 becomes zero irrespective of the transition permission value {fi} of the bit corresponding to the transition number N=2 outputted this time from the comparator 22. This means that the state transition with the transition number N=2 does not occur consecutively. By doing so, there is no consecutive changing of the same bit, and a state transition that returns to the most recent state does not occur.

The other operations of the transition control unit 30 are the same as the transition control unit 20 according to the first embodiment, and the optimization apparatus according to the second embodiment has the same effect as the optimization apparatus according to the first embodiment.

Third Embodiment

Figure 10:
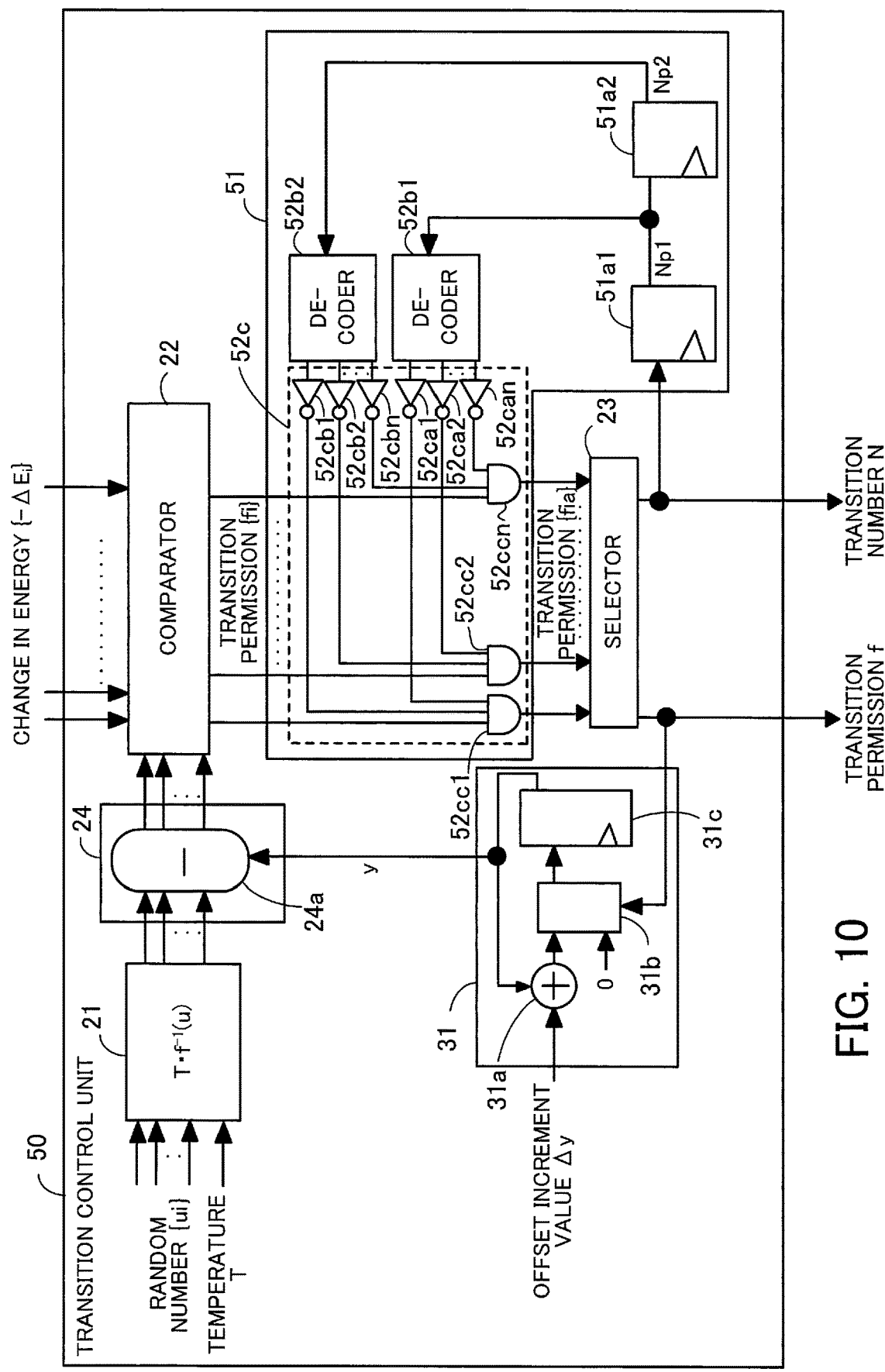
FIG. 10 depicts one example of a circuit configuration of a transition control unit in an optimization apparatus according to a third embodiment.

FIG. 10 depicts one example of the circuit configuration of a transition control unit in an optimization apparatus according to a third embodiment. Elements that are the same as the transition control unit depicted in FIG. 6 have been assigned the same reference numerals.

The transition control unit 50 in the optimization apparatus according to the third embodiment differs to the transition control unit 30 depicted in FIG. 6 by having a transition prohibiting circuit 51 that prohibits not only transitions for bits affected by the previous transition but also transitions for bits affected by the previous-but-one transition.

The transition prohibiting circuit 51 includes registers 51a1 and 51a2, decoders 52b1 and 52b2, and a transition prohibiting unit 52c.

The register 51a1 fetches and stores the transition number N outputted by the selector 23 at timing that is synchronized with a clock signal, not illustrated, and outputs as the transition number Np1. The register 51a2 fetches and stores the transition number Np1 outputted by the register 51a1 at timing that is synchronized with a clock signal, not illustrated, and outputs as a transition number Np2. When the transition numbers N, Np1, and Np2 are 0 to 1024, the bit widths of the registers 51a1 and 51a2 are 10 bits.

The decoder 52b1 decodes the transition number Np1 outputted by the register 51a1 and outputs a decode signal for setting the transition permission value {fia} of the bit corresponding to transition number Np1, out of the n bits, at zero. The decoder 52b2 decodes the transition number Np2 outputted by the register 51a2 and outputs a decode signal for setting the transition permission value {fia} of the bit corresponding to transition number Np2, out of the n bits, at zero.

When the transition numbers N, Np1, and Np2 are 0 to 1024, the decoders 52b1 and 52b2 output 1024-bit decode signals. As one example, out of the 1024 bits, the decoder 52b1 sets a bit in the decode signal that corresponds to the transition number Np1 at zero and sets the other bits in the decode signal at one. Likewise, out of the 1024 bits, the decoder 52b2 sets a bit in the decode signal corresponding to the transition number Np2 at zero and sets the other bits in the decode signal at one.

The transition prohibiting unit 52c sets the transition permission value {fia} of the bits corresponding to the transition numbers Np1 and Np2 at zero based on the decode signals outputted by the decoders 52b1 and 52b2.

In the example in FIG. 10, the transition prohibiting unit 52c includes inverters 52ca1, 52ca2, . . . , 52can, 52cb1, 52cb2, . . . , 52cbn, and AND circuits 52cc1, 52cc2, . . . , 52ccn. The respective inverters 52ca1 to 52can and 52cb1 to 52cbn and the AND circuits 52cc1 to 52ccn are provided so as to respectively correspond to the n bits. As one example, the inverters 52ca1 and 52cb1 and the AND circuit 52cb1 are associated with the first bit out of the n bits. The transition permission value {fi} of the first bit is inputted into the first out of the three input terminals of the AND circuit 52cc1. A decode signal outputted by the decoder 52b1 for setting the transition permission value {fia} of the first bit at zero or one is inputted via the inverter 52ca1 into the second out of the three input terminals of the AND circuit 52cc1. A decode signal outputted by the decoder 52b2 for setting the transition permission value {fia} of the first bit at zero or one is inputted via the inverter 52cb1 into the third out of the three input terminals of the AND circuit 52cc1. The output signal of the AND circuit 52cc1 is outputted as the transition permission value {fia} of the first bit.

An example operation of the transition prohibiting circuit 51 will now be described.

When the previous transition number N outputted by the selector 23 is 2 and the previous-but-one transition number N outputted by the selector 23 is 1, the register 51a1 outputs 2 as the transition number Np1 and the register 51a2 outputs 1 as the transition number Np2. At this time, the decoder 52b1 supplies one to the inverter 52ca2 out of the inverters 52ca1 to 52can and supplies zero to the other inverters. The decoder 52b2 supplies one to the inverter 52ca1 out of the inverters 52cb1 to 52cbn and supplies zero to the other inverters. By doing so, the output signals of the AND circuits 52cc1 and 52cc2 become zero irrespective of the values of the transition permission values {fi} of the bits corresponding to the transition numbers N=1, 2 outputted from the comparator 22. This means that the state transition with the transition number N=2 does not consecutively occur and the previous-but-one state transition (that is the state transition with the transition number N=1) does not consecutively occur.

The rest of the operation of the transition control unit 50 is the same as the transition control unit 20 according to the first embodiment, and the optimization apparatus according to the third embodiment has the same effect as the optimization apparatus according to the first embodiment. In addition, by using the transition prohibiting circuit 51 described above, the optimization apparatus according to the third embodiment prohibits not only transitions that return to the most recent state but also state transitions of bits affected by the previous-but-one transition, which promotes the occurrence of newer state transitions.

Note that although an example provided with the transition prohibiting circuit 51 that prohibits transitions for bits affected by the previous transition and also transitions for bits affected by the previous-but-one transition has been described above, it is also possible to prohibit transitions for bits affected by earlier transitions. A transition prohibiting circuit with this capability is realized by appropriately increasing the number of registers, decoders, and the like.

Figure 11:
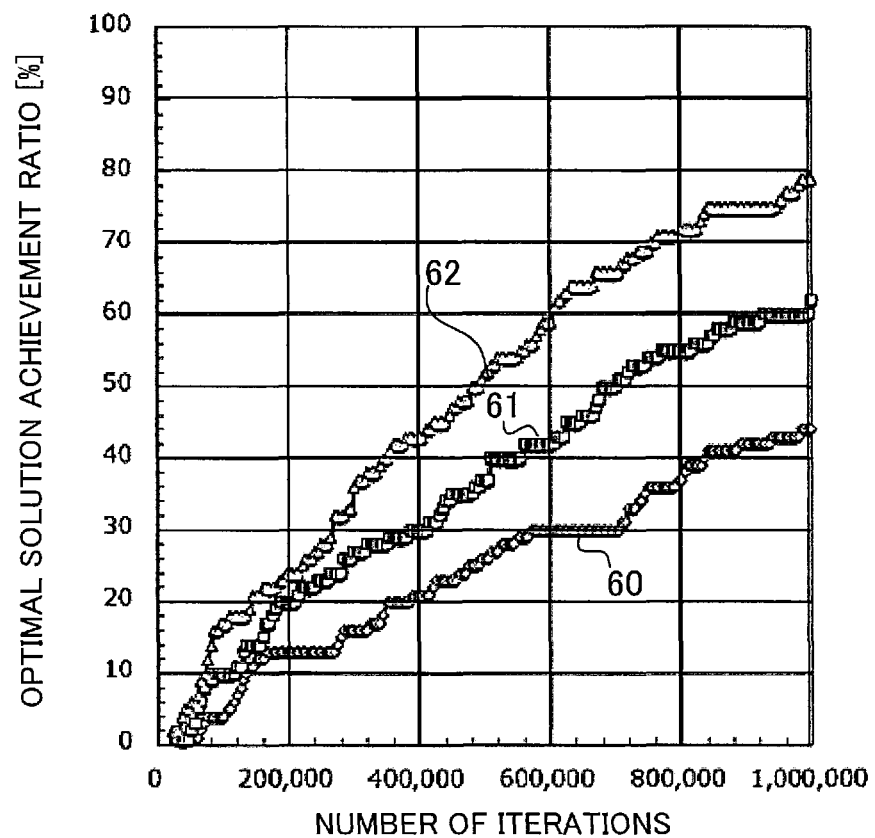
FIG. 11 depicts one example of the result of a software simulation of simulated annealing realized using the transition control units in FIGS. 3, 6, and 10.

FIG. 11 depicts one example of the result of a software simulation of simulated annealing realized using the transition control units in FIGS. 3, 6, and 10. The problem to be optimized is a 32-city traveling salesman problem that has been formulated as an Ising model (Boltzmann machine). The horizontal axis represents the number of iterations and the vertical axis represents the optimal solution achievement ratio (i.e., the extent to which the optimal solution has been achieved, expressed as a percentage).

A result 60 indicates the relationship between the number of iterations and the optimal solution achievement ratio when the transition control unit 20a in FIG. 3 is used and a result 61 indicates the relationship between the number of iterations and the optimal solution achievement ratio when the transition control unit 30 in FIG. 6 is used. A result 62 indicates the relationship between the number of iterations and the optimal solution achievement ratio when the transition control unit 50 in FIG. 10 is used.

From FIG. 11, it is understood that the optimal solution is reached faster when the transition control unit 30 according to the second embodiment depicted in FIG. 6 is used compared to when the transition control unit 20a according to the first embodiment depicted in FIG. 3 is used. It is also understood that the optimal solution is reached even faster when the transition control unit 50 according to the third embodiment depicted in FIG. 10 is used.

Fourth Embodiment

Figure 12:
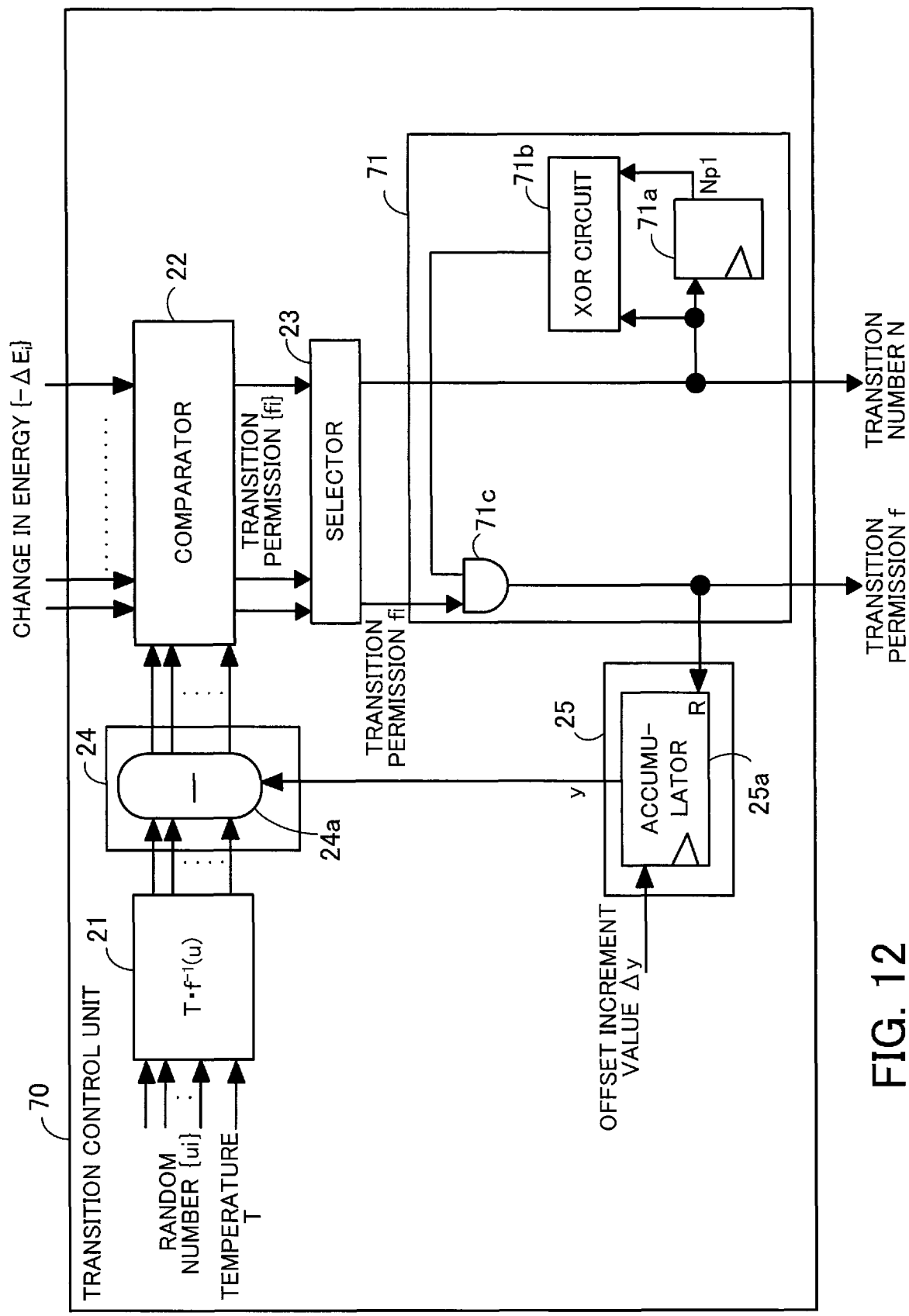
FIG. 12 depicts one example of a circuit configuration of a transition control unit in an optimization apparatus according to a fourth embodiment.

FIG. 12 depicts one example of the circuit configuration of a transition control unit in an optimization apparatus according to a fourth embodiment. Elements that are the same as the transition control unit depicted in FIG. 1 have been assigned the same reference numerals.

The transition control unit 70 in the optimization apparatus according to the fourth embodiment differs to the transition control unit 20 depicted in FIG. 1 by having a transition prohibiting circuit 71 provided not only between the comparator 22 and the selector 23 but also downstream of the selector 23.

The transition prohibiting circuit 71 includes a register 71a as an example of a holding unit that holds the transition number N, an XOR circuit 71b, and an AND circuit 71c.

At timing that is synchronized with a clock signal, not illustrated, the register 71a fetches and stores the transition number N outputted by the selector and outputs as the transition number Np1. When the transition numbers N and Np1 are 0 to 1024, the bit width of the register 71a is 10 bits.

The XOR circuit 71b realizes the same functions as the decoder 32b in FIG. 6 and outputs a signal (that corresponds to the decode signal) for setting the transition permission value f of a bit corresponding to the transition number Np1 outputted by the register 71a at zero. The XOR circuit 71b outputs zero when the transition number Np1 outputted by the register 71a matches the transition number N outputted by the selector 23 and outputs one when the two numbers differ. It is possible to realize the XOR circuit 71b using a plurality of two input XOR circuits that output an XOR result of each input/output bit of the register 71a and an OR circuit that outputs a logical OR for the plurality of XOR results.

Note that in the following description, to distinguish from the transition permission value f outputted by the transition control unit 70, the transition permission value outputted by the selector 23 is indicated as the "transition permission value fi".

The AND circuit 71c realizes the same functions as the transition prohibiting unit 32c in FIG. 6 and based on a signal outputted by the XOR circuit 71b, sets the bit corresponding to the transition number Np1 at zero. The transition permission value fi outputted by the selector 23 is inputted into one input terminal of the AND circuit 71c and the signal outputted by the XOR circuit 71b is inputted into the other input terminal. The AND circuit 71c is outputted from the transition control unit 70 as the transition permission value f.

The following describes an example operation of the transition control unit 70 described above.

In each iteration described earlier, the thermal excitation energy generating unit 21 receives a number of independent uniform random numbers {ui} that is equal to the number of state transition candidates and converts these values to values of an inverse function $f^{-1}(u)$ using the noise table. By then multiplying the values outputted by conversion by a common temperature T, the thermal excitation energy generating unit 21 generates the thermal excitation energy threshold in the Metropolis method or the Gibbs method.

From the thermal excitation energy threshold generated for each transition candidate, the subtractor 24a subtracts the offset y outputted by the accumulator 25a and the comparator 22 compares the subtraction results outputted by the subtractor 24a with the change in energy $\{-\Delta E_i\}$. Based on the comparison result, the comparator 22 outputs transition permission values {fi} indicating whether each state transition is permitted.

Based on a random number, the selector 23 randomly selects one of the state transitions and outputs the transition permission value {fi} of the selected state transition as the transition permission value fi. When the transition is permitted, the transition permission value fi is one, and when the transition is not permitted, the transition permission value fi is zero. The selector 23 also outputs the transition number N indicating the selected state transition.

At the transition prohibiting circuit 71, the XOR circuit 71b outputs zero when the selector 23 has outputted the same transition number N as the previous transition and the AND circuit 71c outputs zero as the transition permission value f, thereby prohibiting a change to the same bits as the previous transition. That is, a transition that returns to the most recent state is prohibited.

The rest of the operation of the transition control unit 70 is the same as the transition control unit 20 according to the first embodiment. With the optimization apparatus according to the fourth embodiment, there is a fall in the transition probability compared to the optimization apparatus according to the first or second embodiment, but since transitions that return to the most recent state are prohibited, the same effect as the optimization apparatuses according to the first and second embodiments is obtained. In addition, with the optimization apparatus according to the fourth embodiment, as depicted in FIG. 12, since it is possible to use a simpler configuration for the transition prohibiting circuit 71 than the transition prohibiting circuit 32 depicted in FIG. 6, it is possible to reduce the scale of the circuitry.

Fourth Embodiment

Figure 13:
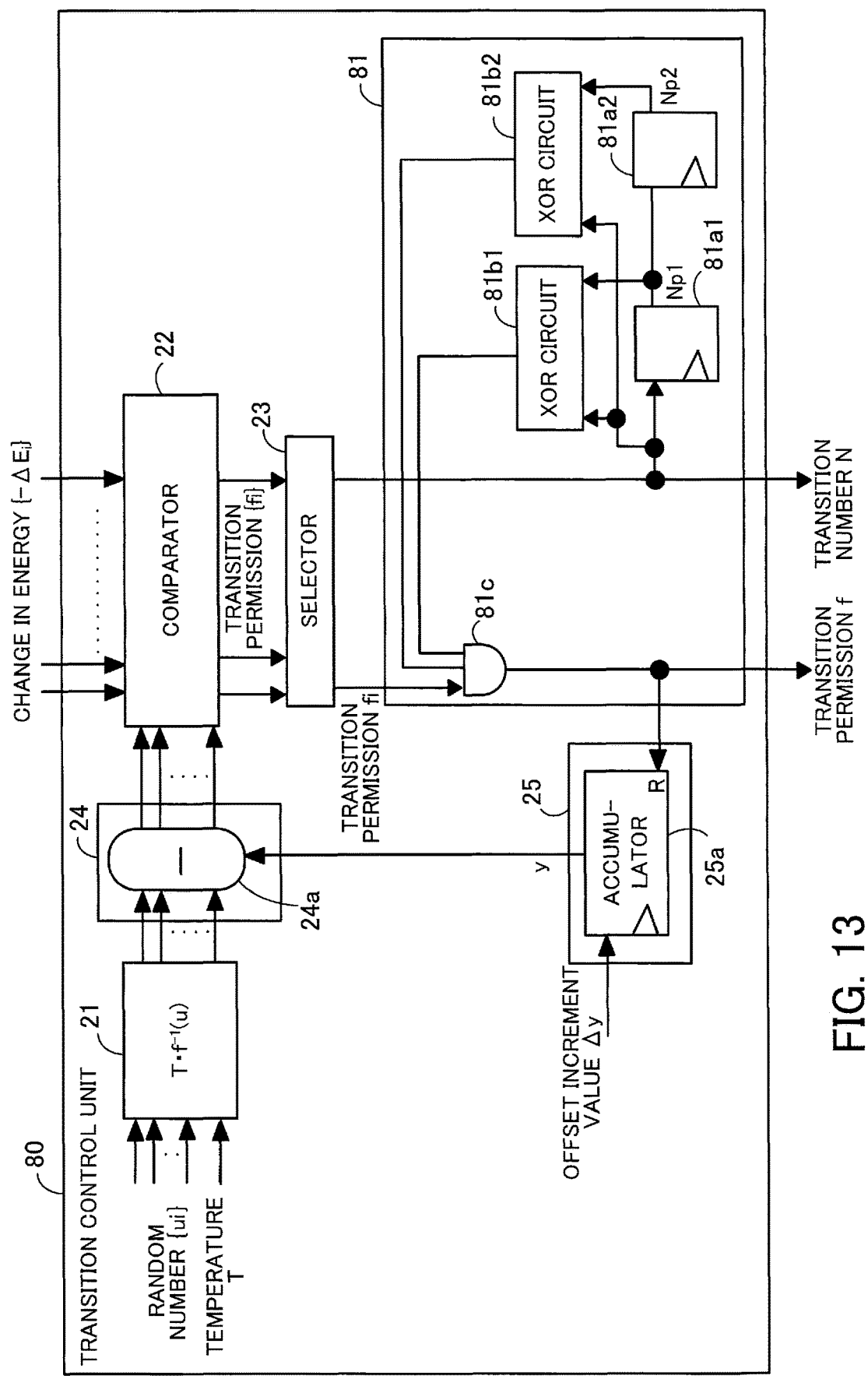
FIG. 13 depicts one example of the circuit configuration of a transition control unit in an optimization apparatus according to a fifth embodiment.

FIG. 13 depicts one example of the circuit configuration of a transition control unit in an optimization apparatus according to a fifth embodiment. Elements that are the same as the transition control unit depicted in FIG. 12 have been assigned the same reference numerals.

The transition control unit 80 in the optimization apparatus according to the fifth embodiment differs to the transition control unit 70 depicted in FIG. 12 by having a transition prohibiting circuit 81 that prohibits not only transitions to bits affected by the previous transition but also transitions to bits affected by the previous-but-one transition.

The transition prohibiting circuit 81 includes registers 81a1 and 81a2, XOR circuits 81b1 and 81b2, and an AND circuit 81c.

The register 81a1 fetches and stores the transition number N outputted by the selector 23 at timing that is synchronized with a clock signal, not illustrated, and outputs as the transition number Np1. The register 81a2 fetches and stores the transition number Np1 outputted by the register 81a1 at timing that is synchronized with a clock signal, not illustrated, and outputs as a transition number Np2. When the transition numbers N, Np1, and Np2 are 0 to 1024, the bit widths of the registers 81a1 and 81a2 are 10 bits.

The XOR circuit 81b1 outputs a signal for setting the transition permission value f of the bit corresponding to the transition number Np1 outputted by the register 81a1 at zero. The XOR circuit 81b1 outputs zero when N=Np1 and outputs one when N≠Np1.

The XOR circuit 81b2 outputs a signal for setting the transition permission value f of the bit corresponding to the transition number Np2 outputted by the register 81a2 at zero. The XOR circuit 81b2 outputs zero when N=Np2 and outputs one when N≠Np2.

Based on the signals outputted by the XOR circuits 81b1 and 81b2, the AND circuit 81c sets the transition permission value f of bits corresponding to the transition numbers Np1 and Np2 at zero. The transition permission value fi outputted by the selector is inputted into the first out of the three input terminals of the AND circuit 81c. An output signal of the XOR circuit 81b1 is inputted into the second out of the three input terminals of the AND circuit 81c, and an output signal of the XOR circuit 81b2 is inputted into the third out of the three input terminals. An output signal of the AND circuit 81c is the transition permission value f outputted by the transition control unit 80.

The following describes an example operation of the transition control unit 81 described above.

When the previous transition number N outputted by the selector 23 is 2 and the previous-but-one transition number N outputted by the selector 23 is 1, the register 81a1 outputs 2 as the transition number Np1 and the register 81a2 outputs 1 as the transition number Np2. The XOR circuit 81b1 outputs zero when the transition number N presently outputted by the selector 23 is N=Np1=2. The XOR circuit 81b2 outputs zero when the transition number N presently outputted by the selector 23 is N=Np2=1.

This means that when the transition number N presently outputted by the selector 23 is 1 or 2, the transition permission value f outputted by the AND circuit 81c is zero regardless of the value of the transition permission value fi. This means that the state transition with the transition number N=2 does not consecutively occur and the previous-but-one state transition (that is, the state transition with the transition number N=1) also does not occur.

The rest of the operation of the transition control unit 80 is the same as the transition control unit 70 according to the fourth embodiment, and the optimization apparatus according to the fifth embodiment has the same effect as the optimization apparatus according to the fourth embodiment. In addition, by using the transition prohibiting circuit 81 described above, the optimization apparatus according to the fifth embodiment prohibits not only transitions that return to the most recent state but also state transitions of bits affected by the previous-but-one transition, which promotes the occurrence of newer state transitions.

Note that although an example provided with the transition prohibiting circuit 81 that prohibits transitions for bits affected by the previous transition and also transitions for bits affected by the previous-but-one transition has been described above, it is also possible to prohibit transitions for bits affected by earlier transitions. A transition prohibiting circuit with this capability is realized by appropriately increasing the number of registers, decoders, and the like.

Although several examples of an optimization apparatus and a control method for an optimization apparatus according to the present embodiments have been described above, the content given above are to be regarded as illustrative examples to which the present embodiments are not limited.

According to the present embodiments, it is possible to reduce the calculation time of an optimization problem.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:
1. An optimization apparatus comprising:
a state holding unit that holds values of a plurality of state variables included in an evaluation function that represents energy;

an energy calculating unit that calculates a change in the energy for each of a plurality of state transitions that occurs when a value of at least one out of the plurality of state variables changes;

a temperature control unit that controls a temperature; and a transition control unit that adds an offset to each change in the energy when stochastically deciding, based on the temperature, the change, and a random number relating to thermal excitation, whether to accept any of the plurality of state transitions according to a relative relationship between the change and thermal excitation energy, performs control so that the offset at a local minimum where the energy is locally minimized is larger than an offset when the energy is not minimized, holds first transition information indicating a previous state transition, and prohibits a first state transition out of present state transition candidates based on a first decoding result of the held first transition information.

2. The optimization apparatus according to claim 1, wherein the first state transition is a state transition to return to a most recent state.

3. The optimization apparatus according to claim 1, wherein the transition control unit includes:

a thermal excitation energy generating unit that outputs thresholds of the thermal excitation energy that are expressed by a Metropolis method or a Gibbs method and are respectively expressed by a plurality of products produced by multiplying the temperature and a plurality of values of an inverse function for a function that indicates a permission probability of each of the plurality of state transitions in keeping with the random number;

a comparator that outputs a plurality of first judgment results indicating whether to accept each of the plurality of state transitions, the first judgment results being expressed by a plurality of values that correspond to comparison results of comparisons between a plurality of sums produced by adding the offset to the change calculated for each of the plurality of state transitions, and the plurality of products;

a transition prohibiting circuit that outputs, based on the first decoding result, a plurality of second judgment results indicating acceptance of state transitions out of the plurality of first judgment results aside from the first state transition corresponding to the first transition information; and a selector that outputs transition information indicating one state transition out of the plurality of state transitions and outputs, based on the plurality of second judgment results, a value indicating whether the one state transition is to be accepted.

4. The optimization apparatus according to claim 3, wherein the transition prohibiting circuit includes;

a holding unit that holds the first transition information;

a decoder that outputs the first decoding result produced by decoding the first transition information held in the holding unit; and a transition prohibiting unit that outputs the plurality of second judgment results based on the first decoding result.

5. The optimization apparatus according to claim 1, wherein the transition control unit includes:

a thermal excitation energy generating unit that outputs thresholds of the thermal excitation energy that are expressed by a Metropolis method or a Gibbs method and are respectively expressed by a plurality of products produced by multiplying the temperature and a plurality of values of an inverse function for a function that indicates a permission probability of each of the plurality of state transitions in keeping with the random number;

a comparator that outputs a plurality of first judgment results indicating whether to accept each of the plurality of state transitions, the first judgment results being expressed by a plurality of values that correspond to comparison results of comparisons between a plurality of sums produced by adding the offset to the change calculated for each of the plurality of state transitions, and the plurality of products;

a selector that outputs transition information indicating one state transition out of the plurality of state transitions and outputs, based on the plurality of first judgment results, a value indicating whether the one state transition is to be accepted; and a transition prohibiting circuit that outputs, when the transition information matches the first transition information, a value indicating that the first state transition that is the one state transition is not to be accepted.

6. The optimization apparatus according to claim 5, wherein the transition prohibiting circuit includes;

a holding unit that holds the first transition information;

a logical exclusive OR circuit that outputs the first decoding result indicating whether the first transition information and the transition information outputted by the selector match; and a logical AND circuit that outputs, based on the first decoding result, the value indicating that the first state transition is not to be accepted when the transition information and the first transition information match.

7. The optimization apparatus according to claim 1, wherein the transition control unit holds second transition information indicating a second state transition that occurred previous to the previous state transition and prohibits a third state transition based on a second decoding result of the held second transition information.

8. A control method of an optimization apparatus, the method comprising:

holding, by a state holding unit of the optimization apparatus, values of a plurality of state variables included in an evaluation function that represents energy;

calculating, by an energy calculating unit of the optimization apparatus, a change in the energy for each of a plurality of state transitions that occurs when a value of at least one out of the plurality of state variables changes;

controlling, by a temperature control unit of the optimization apparatus, a temperature; and adding, by a transition control unit of the optimization apparatus, an offset to each change in the energy when stochastically deciding based on the temperature, the change, and a random number relating to thermal excitation whether to accept any of the plurality of state transitions according to a relative relationship between the change and thermal excitation energy, performing control so that the offset at a local minimum where the energy is locally minimized is larger than an offset when the energy is not minimized, holding first transition information indicating a previous state transition, and prohibiting a first state transition out of present state transition candidates based on a first decoding result of the held first transition information.

* * * * *